United States Patent [19]
Cole et al.

[11] Patent Number: 5,804,356
[45] Date of Patent: Sep. 8, 1998

[54] RAPID PROCESSING OF SILVER BROMOIODIDE COLOR NEGATIVE FILMS AND DIGITAL IMAGE CORRECTION TO PROVIDE DISPLAY IMAGES HAVING DESIRED AIM COLOR AND TONE SCALE REPRODUCTION

[75] Inventors: David Leroy Cole; Anne Elizabeth Bohan, both of Rochester, N.Y.

[73] Assignee: Eastman Kodak Company, Rochester, N.Y.

[21] Appl. No.: 729,937

[22] Filed: Oct. 15, 1996

[51] Int. Cl.$^6$ .................................... G03C 7/407
[52] U.S. Cl. .................... 430/359; 430/362; 430/963; 358/518; 358/519
[58] Field of Search .................. 430/359, 362, 430/434, 963; 358/518, 519

[56] References Cited

U.S. PATENT DOCUMENTS

| | | | |
|---|---|---|---|
| 4,500,919 | 2/1985 | Schreiber | 358/78 |
| 5,267,030 | 11/1993 | Giorgianni et al. | 358/527 |
| 5,344,750 | 9/1994 | Fujimoto et al. | 430/434 |
| 5,375,000 | 12/1994 | Ray | 358/506 |
| 5,447,811 | 9/1995 | Buhr et al. | 430/359 |
| 5,455,146 | 10/1995 | Nishikawa et al. | 430/383 |
| 5,457,007 | 10/1995 | Asami | 430/363 |
| 5,623,303 | 4/1997 | Inoue et al. | 348/96 |

FOREIGN PATENT DOCUMENTS

| | | |
|---|---|---|
| 0 624 028 A1 | 5/1993 | European Pat. Off. . |
| 4233228 | 10/1992 | Germany . |

*Primary Examiner*—Hoa Van Le
*Attorney, Agent, or Firm*—J. Lanny Tucker

[57] ABSTRACT

Silver bromoiodide color negative films can be rapidly processed using shortened color development times and specific amounts of color developing agent and bromide ion. After development, and optionally desilvering or fixing, the developed film is scanned to form density representative digital signals for the color records. These signals are then digitally manipulated to correct both interimage interactions and gamma mismatches among the color records to produce a digital record that is capable of providing a display image having desired aim color and tone scale reproduction. That digital record can then be stored or used to provide corrected display images, such as color prints, using output display devices.

20 Claims, 11 Drawing Sheets

RAPID PROCESSING OF SILVER BROMOIODIDE COLOR NEGATIVE FILMS AND DIGITAL IMAGE CORRECTION TO PROVIDE DISPLAY IMAGES HAVING DESIRED AIM COLOR AND TONE SCALE REPRODUCTION

FIELD OF THE INVENTION

The present invention relates to a method of providing a color display image using rapid processing of silver bromoiodide color negative films and digital manipulation of resulting images to provide color display images with desired aim tone and color reproduction.

BACKGROUND OF THE INVENTION

Production of photographic color images from light sensitive materials basically consists of two processes. First, color negative images are generated by light exposure of camera speed light sensitive films, that are sometimes called "originating" elements because the images are originated therein by the film user (that is, "picture taker"). These negative images are then used to generate positive images in light sensitive materials. These latter materials are sometimes known as "display" elements and the resulting images may be known as "prints" when coated on reflective supports or "films" when coated on nonreflective supports.

The light sensitive materials are processed in automated processing machines through several steps and processing solutions to provide the necessary display images. Traditionally, this service has required a day or more to provide the customer with the desired prints. In recent years, customers have wanted faster service, and in some locations, the time to deliver this service has been reduced to within an hour. Reducing the processing time to within a few minutes is the ultimate desire in the industry. To do this, each step must be shortened.

Reduction in processing time of the "display" elements or color photographic papers has been facilitated by a number of recent innovations, including the use of predominantly silver chloride emulsions in the elements, and various modifications in the processing solutions and conditions so that each processing step is shortened. In some processes, the total time can be reduced to less than two minutes, and even less than 90 seconds.

Color negative films generally comprise little or no silver chloride in their emulsions, and have silver bromide as the predominant silver halide. More typically, the emulsions are silver bromoiodide emulsions with silver iodide levels up to several mol percent. Such films have required these types of emulsions because emulsions containing high silver chloride have generally had insufficient light sensitivity to be used as camera speed materials although they have the advantage of being rapidly processed without major changes to the color developer solution.

To shorten the processing time, specifically the color development time, of films containing silver bromoiodide emulsions, more active color developer solutions are needed. Various attempts have been made to increase color developer activity by increasing the pH, increasing the color developing agent concentration, decreasing the halide ion concentration, or increasing temperature. However, when these changes are made, the stability of the solution and the photographic image quality are often diminished.

For example, when the development temperature is increased from the conventional 37.8° C., and the color developer solution is held (or used) in the processing tanks for extended periods of times, silver bromoiodide elements processed with such solutions often exhibit unacceptably high density in the unexposed areas of the elements, that is unacceptably high Dmin.

Keeping of processing solutions for extended periods of time at high temperature for use in rapid high temperature color development of silver bromoiodide films has been accomplished by the use of a specific hydroxylamine antioxidant, as described in copending and commonly assigned U.S. Ser. No. 08/590,241 (filed Jan. 23, 1996, by Cole).

Various methods have been proposed for overcoming problems encountered in processing high chloride silver halide emulsion-containing elements, but little has been done to address the problems for rapid processing of silver bromoiodide elements. For example, novel antioxidants have been developed to stabilize developer solutions (e.g., U.S. Pat. No. 4,897,339 of Andoh et al, U.S. Pat. No. 4,906,554 of Ishikawa et al, and U.S. Pat. No. 5,094,937 of Morimoto). High silver chloride emulsions have been doped with iridium compounds, as described in EP-A-0 488 737. Dyes have been developed to eliminate dye remnants from rapid processing as described in U.S. Pat. No. 5,153,112 of Yoshida et al. Novel color developing agents have been proposed for rapid development as described in U.S. Pat. No. 5,278,034 of Ohki et al.

All of the foregoing methods have been designed for processing high silver chloride photographic papers, and have not been shown to be effective in processing color negative silver bromoiodide films.

U.S. Pat. No. 5,344,750 (Fujimoto et al) describes a method for processing elements containing silver iodobromide emulsions that is allegedly rapid, including color development for 40–90 seconds. The potential problems of low sensitivity and high fog in rapidly developed elements is asserted to be overcome by using a color development temperature and an amount of color developing agent and bromide ion in the color developer that are determined by certain mathematical relationships. That is, the amount of color developing agent and bromide ion is considered to be related, and the development temperature and bromide ion concentration are related, both relationships being expressed in mathematical equations.

It has been found, however, that even when the relationships described in U.S. Pat. No. 5,344,750 are followed and color negative films are color developed in short times (less than 90 seconds), the color balance of the three color records cannot be maintained through a useful exposure range. By "color balance" is meant the display image, produced from a neutral exposure of a color negative image, will have a neutral color rendition throughout the useful exposure range. The color record imbalance is caused by the difficulty of getting sufficient development in the color record next to the support without forcing the topmost color record to be overdeveloped, resulting in high fog, contrast or Dmax. This color imbalance in the color records of a multilayer photographic color film cannot be corrected using conventional optical printing of the color negative onto a color display element. Thus, very short development times of the color negative films cannot readily provide negative images in the "originating" color negative film capable of providing display images having acceptable tone scale and color reproduction. This limitation is a serious obstacle to the development of imaging systems with very rapid access to the final photographic print.

U.S. Pat. No. 5,455,146 (Nishikawa et al) describes a method for forming color images in photographic elements containing silver iodobromide emulsions that is allegedly rapid and includes color development for 30–90 seconds. The potential problems of gamma imbalance are asserted to be overcome by controlling the morphology of the light sensitive silver halide emulsion grains, the thickness and swell rate of the photographic film, and the ratio of 2-equivalent color couplers to total couplers in the red-sensitive silver halide emulsion layer. However, the methods described in this patent require a color negative film to be specifically constructed with the noted features to correct gamma imbalance, but they do not correct the color imbalance produced by rapidly developing commercially available color negative films that do not have the noted features. In other words, the method of gamma correction requires a specific film and cannot be applied to any film on the market.

After a color negative film has been chemically processed in the manner described above, it can be scanned to create a digital representation of the image. The most common approach to scanning an image is to record the transmission of a light beam, point-by-point or line-by-line. In color photography, blue, green and red scanning beams are modulated by the yellow, magenta and cyan image dyes, respectively. In a variant color scanning approach, the blue, green and red scanning beams are combined into a single white scanning beam modulated by the image dyes that is read through blue, green and red filters to create separate color records. These records can then be read into any convenient memory medium (for example, an optical disk). Systems in which the image is passed through an intermediate device, such as a scanner or computer, are often referred to as "hybrid" imaging systems.

A hybrid imaging system must include a method for scanning or otherwise measuring the individual picture elements of the photographic media, which serve as input to the system, to produce image-bearing signals. In addition, the system must provide a means for transforming the image-bearing signals into an image representation or encoding that is appropriate for the particular uses of the system.

Hybrid imaging systems have numerous advantages because they are free of many of the classical constraints of photographic embodiments. For example, systematic manipulation (for example, image reversal, and hue and tone alteration) of the image information, that would be cumbersome or impossible to accomplish in a controlled manner in a photographic element, is readily achieved. The stored information can be retrieved from memory to modulate light exposures necessary to recreate the image as a photographic negative, slide or print at will. Alternatively, the image can be viewed on a video display or printed by a variety of techniques beyond the bounds of classical photography, such as electrophotography, ink jet printing, dye diffusion printing and other techniques known in the art.

U.S. Pat. No. 4,500,919 (Schreiber) describes an image reproduction system in which an electronic reader scans an original color image and converts it to electronic image-bearing signals. A computer workstation and an interactive operator interface, including a video monitor, permit an operator to edit or alter the image-bearing signals by means of displaying the image on the monitor. The workstation causes the output device to produce an inked output corresponding to the displayed image. The image representation or encoding is meant to represent the colorimetry of the image being scanned. Calibration procedures are described for transforming the image-bearing signals to an image representation or encoding so as to reproduce the colorimetry of a scanned image on the monitor and to subsequently reproduce the colorimetry of the monitor image on the inked output.

However, representation of the image recorded by the film is not necessarily the desired final image. U.S. Pat. No. 5,375,000 (Ray et al) teaches that the scanned image can be modified with a function representing the inverse of the film characteristic curve [density vs. log(exposure)] to obtain a representation of the image more closely representing the original image log(exposure). This approach could be used to restore the mismatched gammas in the negative film caused by rapid processing. However, modern color negative films are also designed to have chemical interactions (interimage) between the different color records to achieve a desired color position, and not necessarily a perfect rendition of the original scene. These interactions are dependent upon processing time and will produce color errors in a rapidly processed film. These changes in interimage cannot be corrected using conventional color correction tools but can be corrected when the image information has been transformed into a digital representation of the image density.

EP-A-0 624 028 (Giorgianni et al) describes an imaging system in which image-bearing signals are converted to a different form of image representation or encoding, representing the corresponding colorimetric values that would be required to match, in the viewing conditions of a uniquely defined reference viewing environment, the appearance of the rendered input image as that image would appear, if viewed in a specific input viewing environment. The described system allows for input from disparate types of imaging media, such as photographic negatives as well as transmission and reflection positives. The image representation or encoding of that system is meant to represent the color appearance of the image being scanned (or the rendered color appearance computed from a negative being scanned), and calibration procedures are described so as to reproduce that appearance on the monitor and on the final output device or medium.

U.S. Pat. No. 5,267,030 (Giorgianni et al) describes a method for deriving, from a scanned image, recorded color information that is substantially free of color alterations produced by the color reproduction properties of the imaging element. In this reference, the described system computationally removes the effects of media-specific signal processing as far as possible, from each input element used by the system. In addition, the chromatic interdependencies introduced by the secondary absorptions of the image-forming dyes, as measured by the responsivities of the scanning device, are also computationally removed. Use of the methods described in this reference transforms the signals measured from the imaging element to the exposures recorded from the original image.

There remains a need for a process for providing color display images from images originated in commercially available silver bromoiodide films and correcting color imbalances that occur in the color records from the rapidity of the film processing.

SUMMARY OF THE INVENTION

The problems described above have been overcome with a method for providing a color display image comprising:

A) developing an imagewise exposed color silver bromoiodide negative working film having at least two color records, with a color developer solution having a pH of from about 9 to about 12, and comprising:

a color developing agent at from about 0.01 to about 0.1 mol/l, and bromide ion at from 0 to about 0.2 mol/l, the developing being carried out for up to about 90 seconds at a temperature at or above about 40° C., B) scanning the developed film to form density representative signals for the at least two color records, and C) digitally manipulating the density representative signals formed in step B to correct either or both inter-image interactions and gamma mismatches among the at least two color records to produce a digital record providing a display image having desired aim color and tone scale reproduction.

The method of this invention properly corrects for the color imbalance when color negative silver bromoiodide films are rapidly processed under certain color development conditions. Such errors in the color records are not correctable using conventional color printing techniques. However, it has been discovered that the errors can be corrected using:

multi-variable designed experiments to optimize the developer solution composition for short development time, scanning processed silver bromoiodide film to form density representative digital signals of the photographic images, calculating color correction factors from the density representative digital signals corresponding to the specific exposures, utilizing the calculated color correction values and the density representative digital signals corresponding to the photographic images to form corrected density representative digital signals, and utilizing the corrected density representative digital signals to produce display images having correct color and tone scale reproduction.

Thus, a desired aim reproduction (color and tone scales) can be achieved using this invention without the problems with known methods.

DETAILED DESCRIPTION OF THE INVENTION

Figure 1A:
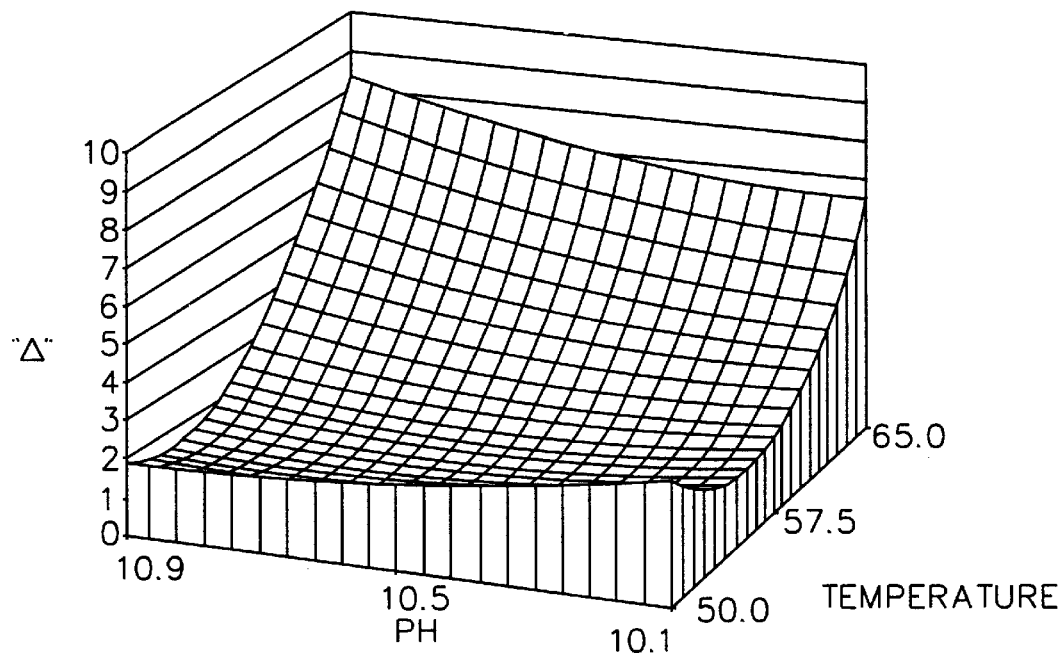
FIGS. 1A, 1B, 1C and 1D are response surface diagrams generated for processing experiments as described in Processing Example 1 below.
Figure 1B:
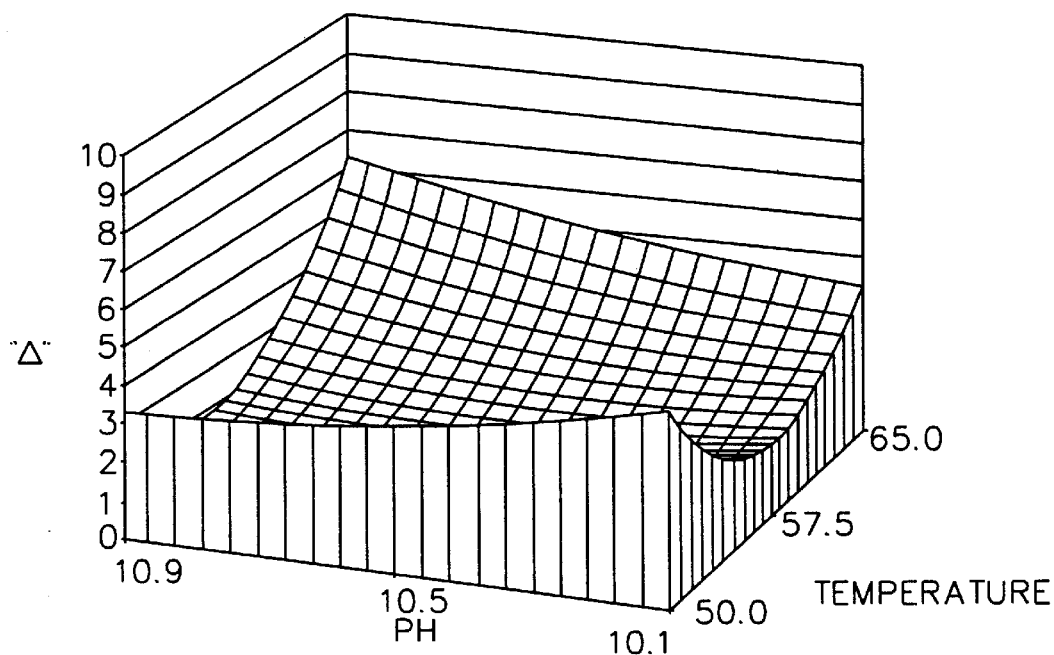
Figure 1C:
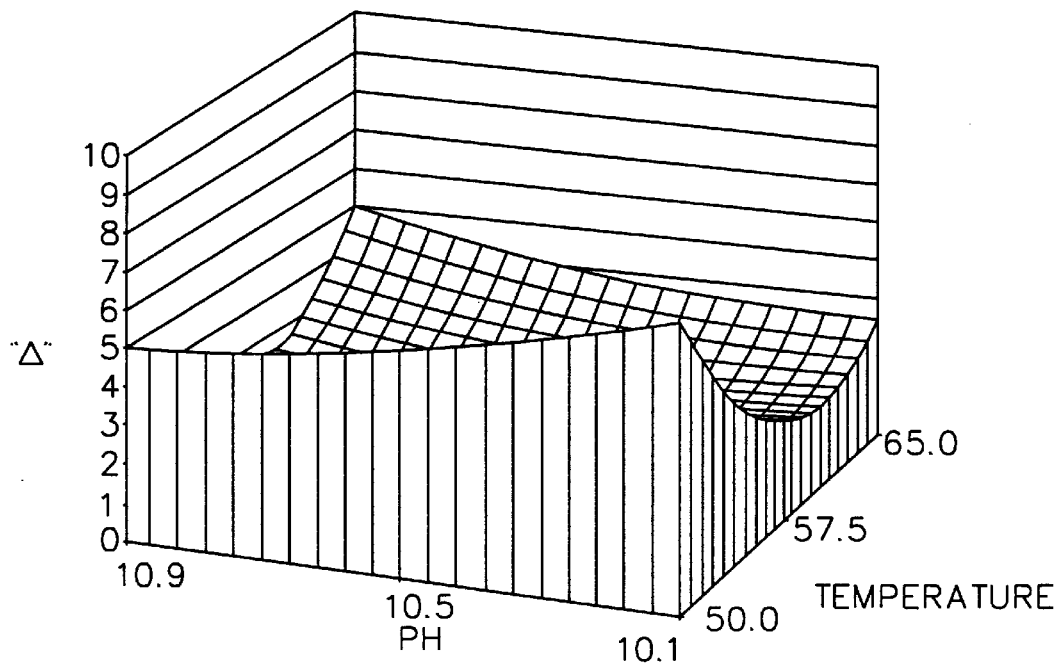
Figure 1D:
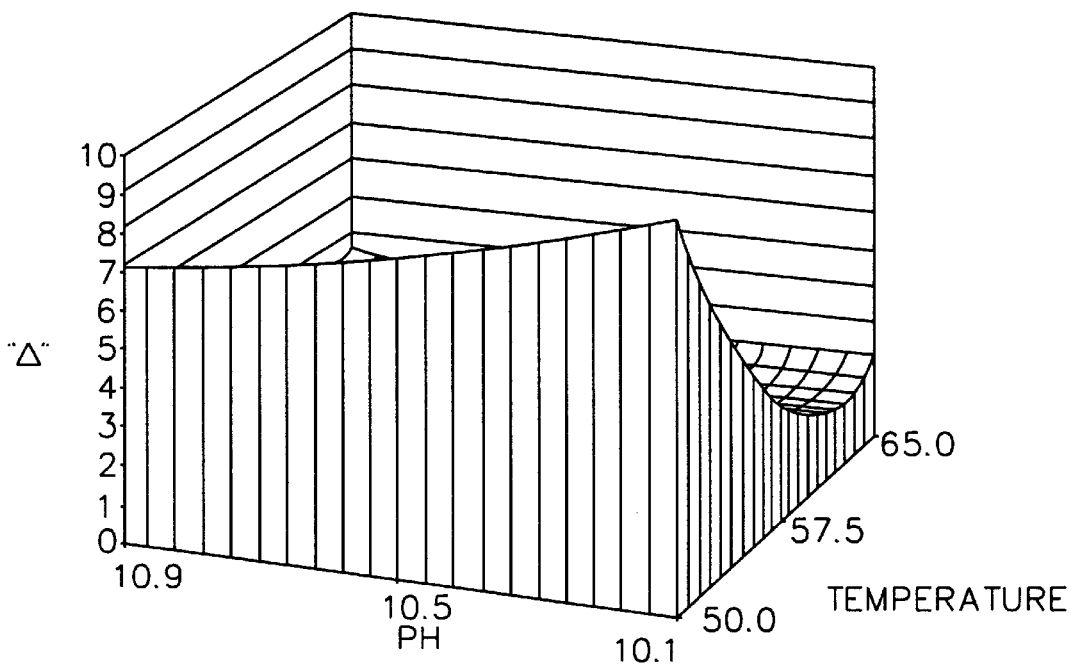
Figure 2A:
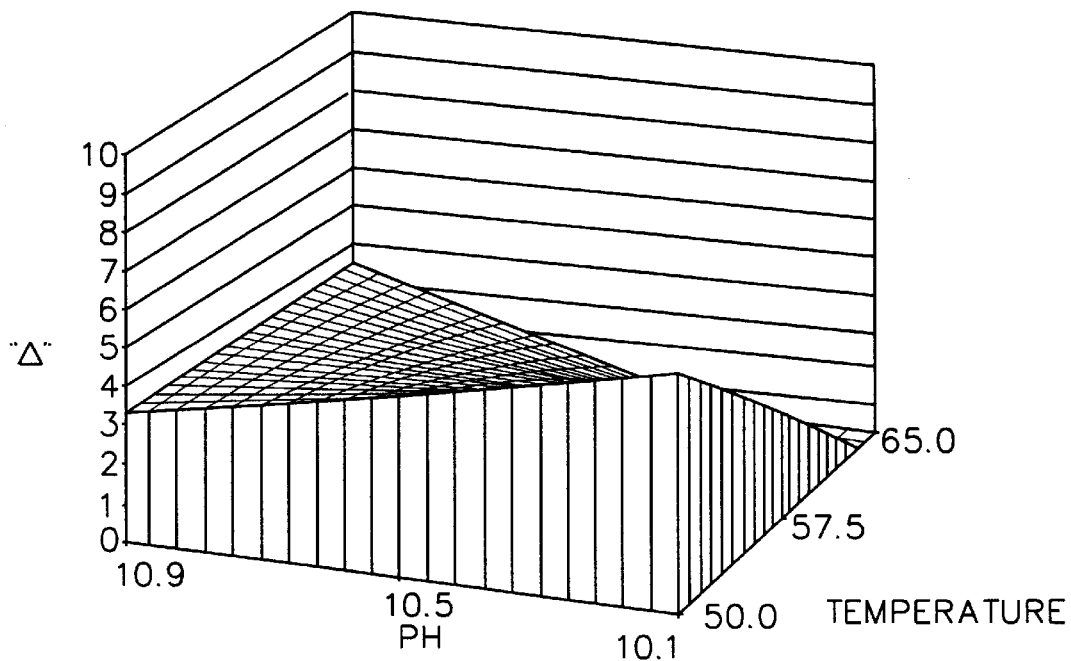
FIGS. 2A, 2B, 2C and 2D are response surface diagrams generated for processing experiments as described in Processing Example 2 below.
Figure 2B:
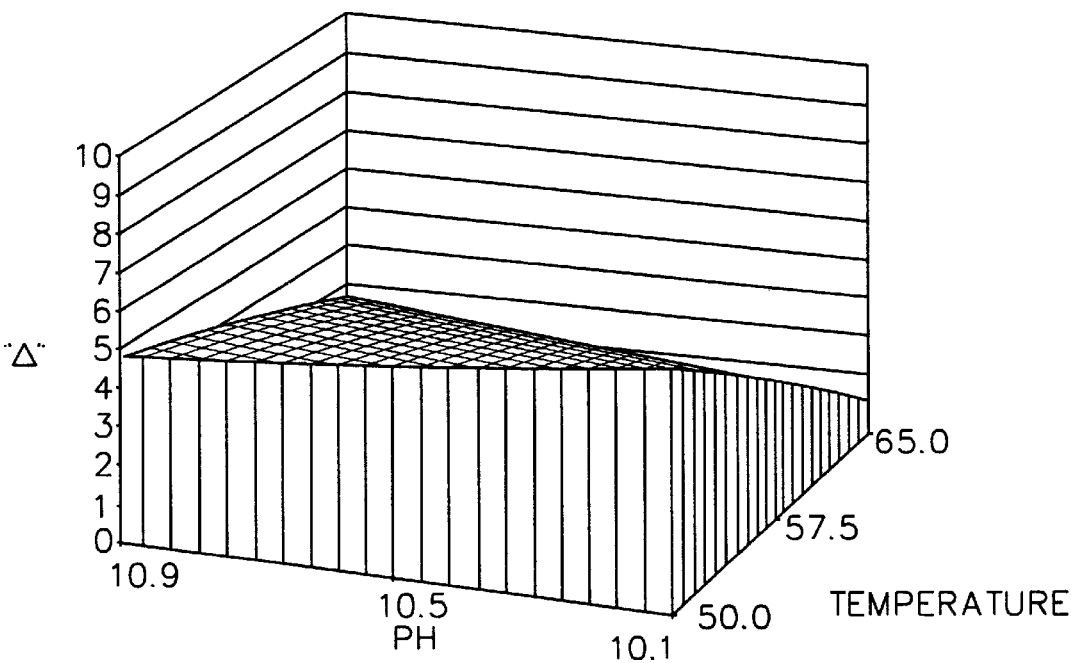
Figure 2C:
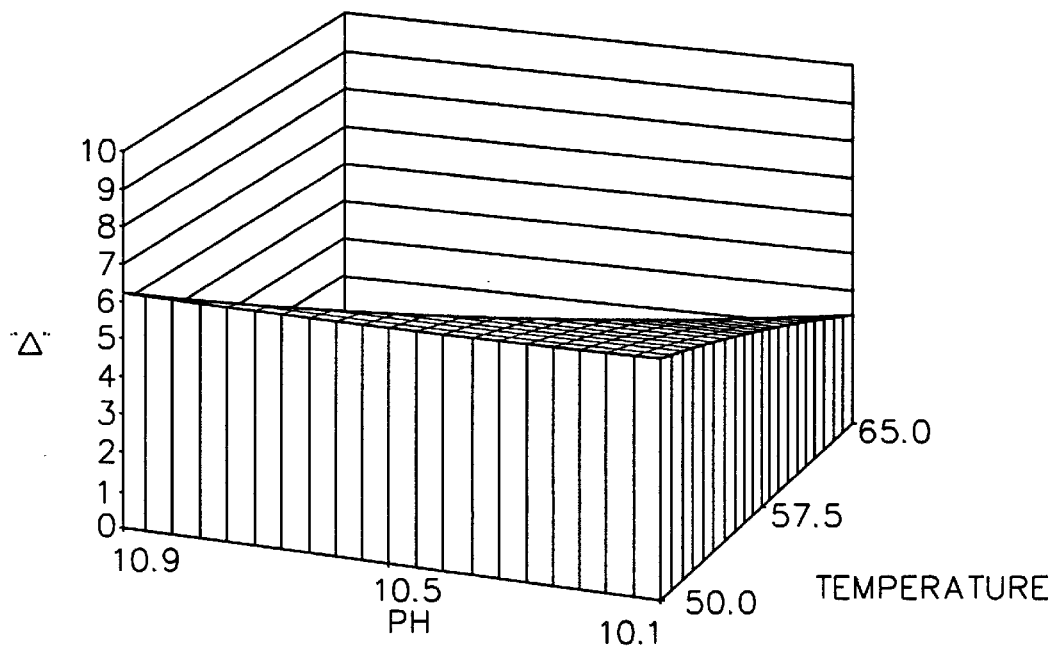
Figure 2D:
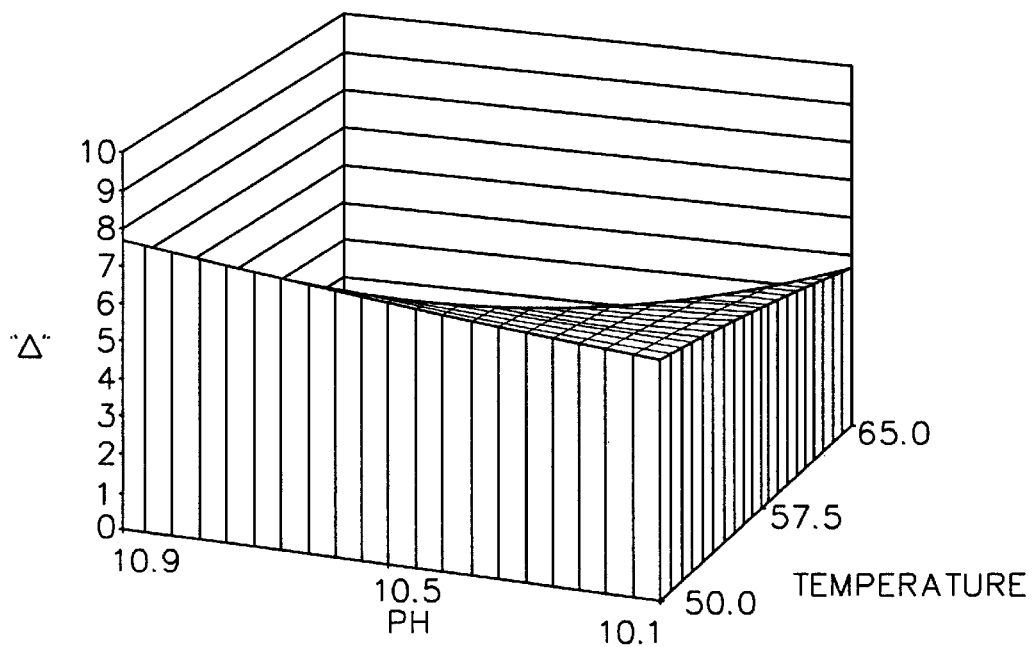
Figure 3A:
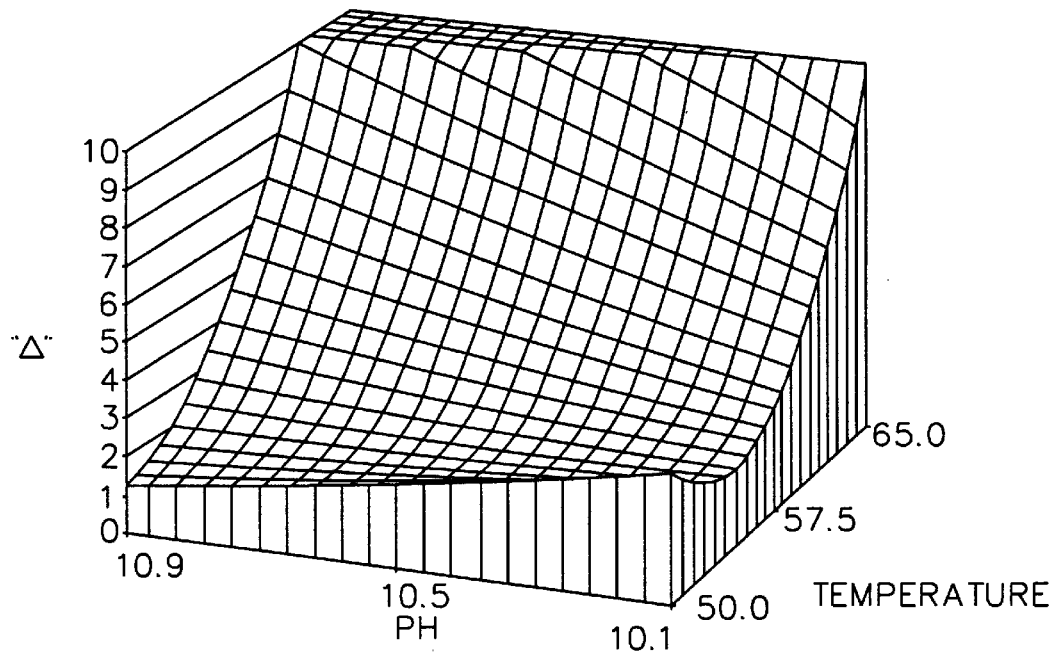
FIGS. 3A, 3B, 3C and 3D are response surface diagrams generated for processing experiments as described in Processing Example 3 below.
Figure 3B:
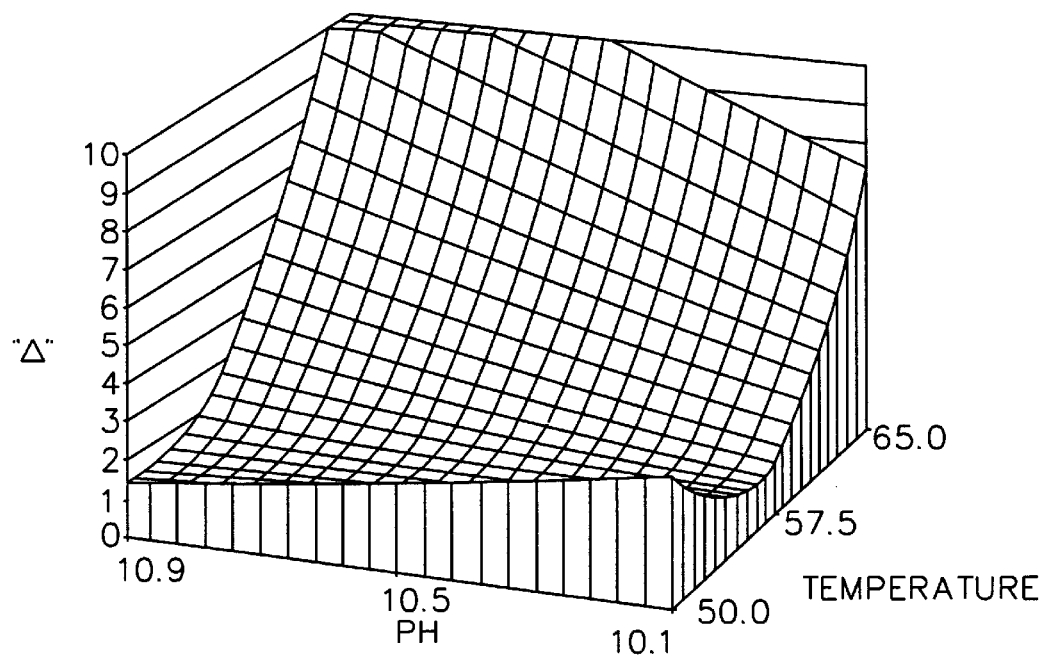
Figure 3C:
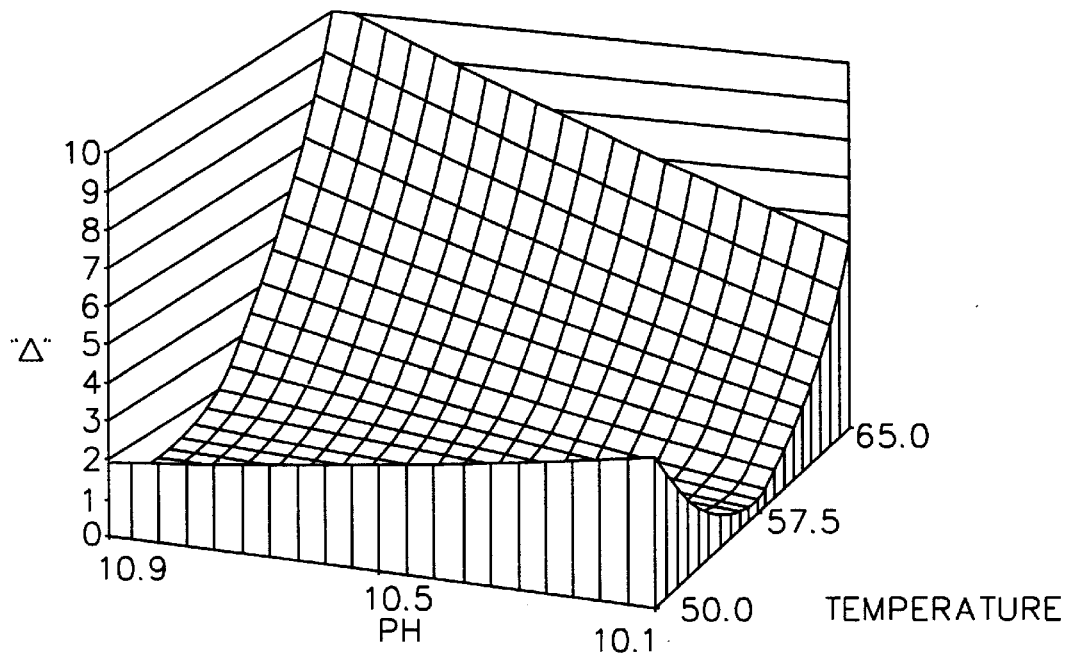
Figure 3D:
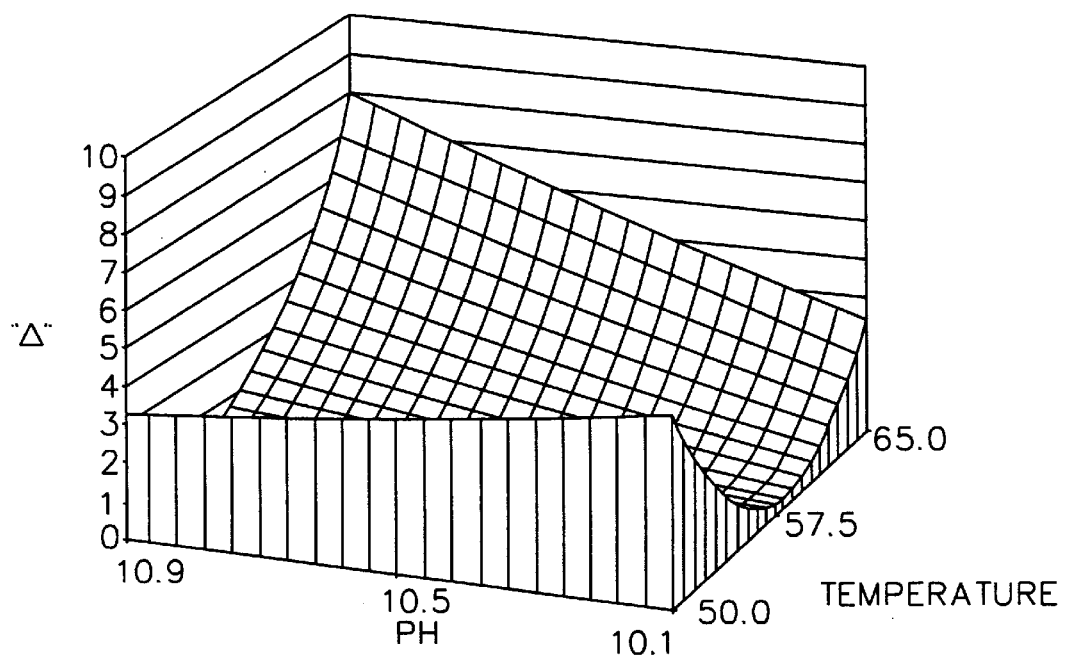

The present invention is particularly useful for processing camera speed negative photographic films containing silver bromoiodide emulsions. Generally, the iodide ion content of such silver halide emulsions is at least 0.5 mol % and less than about 40 mol % (based on total silver), preferably from about 0.05 to about 10 mol %, and more preferably, from about 0.5 to about 6 mol %. Substantially the remainder of the silver halide is silver bromide. There can be very minor amounts of silver chloride (less than 5 mol %, and preferably less than 2 mol %).

The emulsions can be of any regular crystal morphology (such as cubic, octahedral, cubooctahedral or tabular as are known in the art) or mixtures thereof, or irregular morphology (such as multiple twinning or rounded). For tabular grains, preferably, the emulsions have as aspect ratio greater than about 5 and preferably greater than about 8. The size of the tabular grain, expressed as an equivalent circular diameter, is determined by the required speed for the applied use, but is preferably from about 0.06 to about 10 $\mu$m, and more preferably, from about 0.1 to about 5 $\mu$m.

Preferably, the elements have at least two separate light sensitive emulsion layers, at least one being in each of two different color records. More preferably, there are three color records, each having at least one silver bromoiodide emulsion as described herein.

Such elements generally have a camera speed defined as an ISO speed of at least 25, preferably an ISO speed of at least 50 and more preferably, an ISO speed of at least 100.

The speed or sensitivity of color negative photographic materials is inversely related to the exposure required to enable the attainment of a specified density above fog after processing. Photographic speed for color negative films with a gamma of about 0.65 has been specifically defined by the American National Standards Institute (ANSI) as ANSI Standard Number PH 2.27 - 1979 (ASA speed) and relates to the exposure levels required to enable a density of 0.15 above fog in the green light sensitive and least sensitive recording unit of a multicolor negative film. This definition conforms to the International Standards Organization (ISO) film speed rating. For the purpose of this invention, if the film gamma is substantially different from 0.65, the ISO speed is calculated by linearly amplifying or deamplifying the gamma vs. log E(exposure) curve to a value of 0.65 before determining the sensitivity.

The layers of the photographic elements can have any useful binder material or vehicle known in the art, including various types of gelatins and other colloidal materials (or mixtures thereof). One useful binder material is acid processed gelatin that can be present in any layer in any suitable amount.

The photographic elements processed in the practice of this invention are multilayer color elements having at least two color records. Multilayer color elements typically contain dye image-forming units (or color records) sensitive to each of the three primary regions of the visible spectrum. Each unit can be comprised of a single emulsion layer or multiple emulsion layers sensitive to a given region of the spectrum. The layers of the element can be arranged in any of the various orders known in the art. In an alternative format, the emulsions sensitive to each of the three primary regions of the spectrum can be disposed as a single segmented layer. The elements can also contain other conventional layers such as filter layers, interlayers, subbing layers, overcoats and other layers readily apparent to one skilled in the art. A magnetic backing can be used as well as conventional supports. Preferably, transparent supports are employed in the films as are well known in the art.

Considerable details of element structure and components, and suitable methods of processing various types of elements are described in *Research Disclosure*, noted below. Included within such teachings in the art is the use of various classes of cyan, yellow and magenta color couplers that can be used with the present invention. In particular, the present invention can be used to process photographic elements containing pyrazolotriazole magenta dye forming couplers.

Representative color negative films that can be processed using the present invention include, but are not limited to, KODAK ROYAL GOLD® films, KODAK GOLD® films, KODAK PRO GOLD™ films, KODAK FUNTIME™ films, KODAK EKTAPRESS PLUS™ films, EASTMAN EXR™ films, KODAK ADVANTIX™ films, FUJI SUPER G Plus films, FUJI SMARTFILM™ products, FUJICOLOR NEXIA™, KONICA VX films, KONICA SRG3200 film, 3M SCOTCH® ATG films, and AGFA HDC and XRS films.

Further details of such elements, their emulsions and other components are well known in the art, including *Research Disclosure*, publication 36544, pages 501–541 (Sep. 1994). *Research Disclosure* is a publication of Kenneth Mason Publications Ltd., Dudley House, 12 North Street, Emsworth, Hampshire PO10 7DQ England (also available from Emsworth Design Inc., 121 West 19th Street, New York, N.Y. 10011). This reference will be referred to hereinafter as "*Research Disclosure*".

The films described herein are color developed using a color developer solution having a pH of from about 9 to about 12 (preferably from about 9.5 to about 11.0). The color developer solution pH can be adjusted with acid or base to the desired level, and the pH can be maintained using any suitable buffer having the appropriate acid dissociation constants, such as carbonates, phosphates, borates, tetraborates, phosphates, glycine salts, leucine salts, valine salts, proline salts, alanine salts, aminobutyric acid salts, lysine salts, guanine salts and hydroxybenzoates or any other buffer known in the art to be useful for this purpose.

The color developer also includes one or more suitable color developing agents, in an amount of from about 0.01 to about 0.1 mol/l, and preferably at from about 0.017 to about 0.07 mol/l. Any suitable color developing agent can be used, many of which are known in the art, including those described in *Research Disclosure*, noted above. Particularly useful color developing agents include but are not limited to, aminophenols, p-phenylenediamines (especially N,N-dialkyl-p-phenylenediamines) and others that are well known in the art, such as EP-A 0 434 097A1 (published Jun. 26, 1991) and EP-A 0 530 921A1 (published Mar. 10, 1993). It may be useful for the color developing agents to have one or more water-solubilizing groups.

Bromide ion may be included in the color developer in an amount of up to about 0.02 mol/l, and preferably from about 0.01 to about 0.15 mol/l. Bromide ion can be provided in any suitable salt such as sodium bromide, lithium bromide, potassium bromide, ammonium bromide, magnesium bromide, or calcium bromide.

Preferably, the color developer also includes a small amount of iodide ion from a suitable iodide salt, such as lithium iodide, potassium iodide, sodium iodide, calcium iodide, ammonium iodide or magnesium iodide. The amount of iodide ion is generally at least about $5 \times 10^{-7}$ mol/l, and preferably from about $5 \times 10^{-7}$ to about $2 \times 10^{-5}$ mol/l.

In addition to the color developing agent, bromide salts and buffers, the color developer can contain any of the other components commonly found in such solutions, including but not limited to, preservatives (also known as antioxidants), metal chelating agents (also known as metal sequestering agents), antifoggants, optical brighteners, wetting agents, stain reducing agents, surfactants, defoaming agents, auxiliary developers (such as those commonly used in black-and-white development), development accelerators, and water-soluble polymers (such as a sulfonated polystyrene).

Useful preservatives include, but are not limited to, hydroxylamines, hydroxylamine derivatives, hydroxamic acid, hydrazines, hydrazides, phenols, hydroxyketones, aminoketones, saccharides, sulfites, bisulfites, salicylic acids, alkanolamines, alpha-amino acids, polyethylineimines, and polyhydroxy compounds. Mixtures of preservatives can be used if desired. Hydroxylamine or hydroxylamine derivatives are preferred.

Antioxidants particularly useful in the practice are represented by the formula:

R—L—N(OH)—L'—R' wherein L and L' are independently substituted or unsubstituted alkylene of 1 to 8 carbon atoms (such as methylene, ethylene, n-propylene, isopropylene, n-butylene, 1,1-dimethylethylene, n-hexylene, n-octylene and t-butylene), or substituted or unsubstituted alkylenephenylene of 1 to 3 carbon atoms in the alkylene portion (such as benzylene, dimethylenephenylene, and isopropylenephenylene).

The alkylene and alkylenephenylene groups can also be substituted with up to 4 substituents that do not interfere with the stabilizing effect of the molecule, or the solubility of the compound in the color developer solution. Such substituents must be compatible with the color developer components and must not negatively impact the photographic processing system. Such substituents include but are not limited to, alkyl of 1 to 6 carbon atoms, fluoroalkyl groups of 1 to 6 carbon atoms, alkoxy of 1 to 6 carbon atoms, phenyl, hydroxy, halo, phenoxy, alkylthio of 1 to 6 carbon atoms, acyl groups, cyano, or amino.

In the noted formula, R and R' are independently hydrogen, carboxy, sulfo, phosphono, carbonamido, sulfonamido, hydroxy, alkoxy (1 to 4 carbon atoms) or other acid groups, provided that at least one of R and R' is not hydrogen. Salts of the acid groups are considered equivalents in this invention. Thus, the free acid forms of the hydroxylamines can be used, as well as the organic or inorganic salts of the acids, such as the alkali metal, pyridinium, tetraethylammonium, tetramethylammonium and ammonium salts. The sodium and potassium salts are the preferred salts. In addition, readily hydrolyzable ester equivalents can also be used, such as the methyl and ethyl esters of the acids. When L or L' is alkylenephenylene, the carboxy, sulfo or phosphono group is preferably at the para position of the phenylene, but can be at other positions if desired. More than one carboxy, sulfo or phosphono group can be attached to the phenylene radical.

Preferably, one or both of R and R' are hydrogen, carboxy or sulfo, with hydrogen and sulfo (or salts or readily hydrolyzable esters thereof) being more preferred. Most preferably, R is hydrogen and R' is sulfo (or a salt thereof).

Preferably, L and L' are independently substituted or unsubstituted alkylene of 3 to 6 carbon atoms (such as n-propyl, isopropyl, n-butyl, sec-butyl, t-butyl, n-pentyl, 1-methylpentyl and 2-ethylbutyl), or substituted or unsubstituted alkylenephenylene having 1 or 2 carbon atoms in the alkylene portion (such as benzyl, and dimethylenephenyl).

More preferably, at least one, and optionally both, of L and L' is a substituted or unsubstituted alkylene group of 3 to 6 carbon atoms that is branched at the carbon atom directly attached (that is, covalently bonded) to the nitrogen atom of the hydroxylamine molecule. Such branched divalent groups include, but are not limited to, isopropylene, sec-butylene, t-butylene, sec-pentylene, t-pentylene, sec-hexylene and t-hexylene. Isopropylene is most preferred.

In one embodiment, L and L' are the same. In other and preferred embodiments, they are different. In the latter embodiment, L is more preferably a branched alkylene as described above, and L' is a linear alkylene of 1 to 6 carbon atoms (such as methylene, ethylene, n-propylene, n-butylene, n-pentylene and n-hexylene).

Representative hydroxylamine derivatives useful of the noted formula include, but are not limited to, N-isopropyl-N-(2-ethanesulfonic acid)hydroxylamine, N,N-bis(propionic acid)hydroxylamine, N,N-bis(2-ethanesulfonic acid)hydroxylamine, N-isopropyl-N-(n-propylsulfonic acid) hydroxylamine, N-2-ethanephosphonic acid-N-(propionic acid)hydroxylamine, N,N-bis(2-ethanephosphonic acid) hydroxylamine, N-sec-butyl-N-(2-ethanesulfonic acid) hydroxylamine, N,N-bis(sec-butylcarboxylic acid) hydroxylamine, N-methyl-N-(p-carboxylbenzyl) hydroxylamine, N-isopropyl-N-(p-carboxylbenzyl) hydroxylamine, N,N-bis(p-carboxylbenzyl)hydroxylamine, N-methyl-N-(p-carboxyl-m-methylbenzyl)hydroxylamine, N-isopropyl-N-(p-sulfobenzyl)hydroxylamine, N-ethyl-N-(p-phosphonobenzyl)hydroxylamine, N-isopropyl-N-(2-carboxymethylene-3-propionic acid)hydroxylamine, N-isopropyl-N-(2-carboxyethyl)hydroxylamine, N-isopropyl-N-(2,3-dihydroxypropyl)hydroxylamine, and alkali metal salts thereof.

The hydroxylamine derivatives described herein as useful antioxidants can be readily prepared using published procedures, such as those described in U.S. Pat. No. 3,287,125, U.S. Pat. No. 3,778,464, U.S. Pat. No. 5,110,985 and U.S. Pat. No. 5,262,563, all incorporated herein by reference for the synthetic methods. One general synthetic procedure for preparing sulfo-substituted hydroxylamine derivatives comprises reacting an N-alkylhydroxylamine with a vinylsulfonate in a suitable solvent (such as water, an alcohol, tetrahydrofuran or methyl ethyl ketone). For the alkali metal salts of vinylsulfonates, water is the best solvent. In cases where the hydroxylammonium salt is available, an equivalent of a base must be used to liberate the free N-alkylhydroxylamine.

The antioxidant described herein is included in the color developer composition useful in this invention in an amount of at least about 0.001 mol/l, and in a preferred amount of from about 0.001 to about 0.5 mol/l. A most preferred amount is from about 0.005 to about 0.5 mol/l. More than one antioxidant can be used in the same color developer composition if desired, but preferably, only one is used.

The elements are typically exposed to suitable radiation to form a latent image and then processed to form a visible dye image. Processing includes the step of color development in the presence of a color developing agent to reduce developable silver halide and to oxidize the color developing agent. Oxidized color developing agent in turn reacts with a color-forming coupler to yield a dye.

Optionally but preferably, partial or total removal of silver and/or silver halide is accomplished after color development using conventional bleaching and fixing solutions (i.e., partial or complete desilvering steps), or fixing only to yield both a dye and silver image. Alternatively, all of the silver and silver halide can be left in the color developed element. One or more conventional washing, rinsing or stabilizing steps can also be used, as is known in the art. These steps are typically carried out before scanning and digital manipulation of the density representative signals.

Development is carried out by contacting the element for up to about 90 seconds (preferably from about 30 to about 90 seconds, and more preferably from about 40 to about 90 seconds) at a temperature above 40° C., and at from about 45° to about 65° C. in suitable processing equipment, to produce the desired developed image.

The overall processing time (from development to final rinse or wash) can be from about 50 seconds to about 4 minutes. Shorter overall processing times, that is, less than about 3 minutes, are desired for processing photographic color negative films according to this invention.

Processing according to the present invention can be carried out using conventional deep tanks holding processing solutions or automatic processing machines. Alternatively, it can be carried out using what is known in the art as "low volume thin tank" processing systems, or LVTT, which have either a rack and tank or automatic tray design. Such processing methods and equipment are described, for example, in U.S. Pat. No. 5,436,118 (Carli et al) and publications noted therein.

The residual error in photographic responses of photographic films that are processed as described above, is corrected by transforming the photographic color negative image to density representative digital signals and applying correction values to those digital signals. The term "correction value" is taken to refer to a broad range of mathematical operations that include, but are not limited to, mathematical constants, matrices, linear and non-linear mathematical relationships, and single and multi-dimensional look-up-tables (LUT's).

The term "density representative digital signals" refers to the electronic record produced by scanning a photographic image point-by-point, line-by-line, or frame-by-frame, and measuring the transmission of light beams, that is blue, green and red scanning beams that are modulated by the yellow, magenta and cyan dyes in the film negative. In a variant color scanning approach, the blue, green and red scanning beams are combined into a single white scanning beam that is modulated by the dyes, and is read through red, green and blue filters to create three separate digital records. Scanning can be carried out using any conventional scanning device.

The records produced by image dye modulation can then be read into any convenient memory medium (for example, an optical disk) for future digital manipulation or used immediately to produce a corrected digital record capable of producing a display image having desired aim color and tone scale reproduction. The aim color and tone scale reproduction may differ for a given photographic film image or operator. The advantage of the invention is that whatever the "aim", it can be readily achieved using the present invention.

The corrected digital signals (that is, digital records) can be also forwarded to an output device to form the display image. The output device may take a number of forms such as a silver halide film or paper writer, thermal printer, electrophotographic printer, ink jet printer, CRT display, CD disc or other types of storage and output display devices.

In one embodiment of this invention, the density representative digital signals obtained from scanning the high temperature, rapidly processed film ($R_{Ti}$, $G_{Ti}$, $B_{Ti}$) are compared with the density representative digital signals ($R_{oi}$, $G_{oi}$, $B_{oi}$) obtained from standard processing of the same film having identical exposures, and a correction factor is determined. The standard processing conditions could be those used in the commercial Process C-41 (e.g., color development for 3 minutes, 15 seconds, bromide ion level of 0.013 mol/l, color developing agent level of 0.015 mol/l, temperature of 37.8° C., and a pH of 10.0) for processing color negative films.

In its simplest form, the correction factor can be derived from two exposures that are selected to exceed the minimum exposure required to produce a density above Dmin and are less than the minimum exposure required to achieve Dmax. Preferably, these exposures are selected to be as different as possible while falling within the region that exhibits a linear density response to log exposure. Preferably, the exposures are also neutral. Based on the density representative digital signals obtained for the two exposures in both the rapidly processed, high temperature film according to this invention, and the standard temperature and time processed film, a simple gamma correction factor may be obtained.

Equations 1–3 below are used to calculate the correction factor for the red, green and blue color records respectively:

$$\Delta\gamma_R = \frac{R_{Oi_H} - R_{Oi_L}}{R_{Ti_H} - R_{Ti_L}} \quad (1)$$

$$\Delta\gamma_G = \frac{G_{Oi_H} - G_{Oi_L}}{G_{Ti_H} - G_{Ti_L}} \quad (2)$$

$$\Delta\gamma_B = \frac{B_{Oi_H} - B_{Oi_L}}{B_{Ti_H} - B_{Ti_L}} \quad (3)$$

In the above equations the subscript H and L refer to the high and low exposure levels respectively. In this approach, the density representative digital signals for the high temperature, rapidly processed negative ($R_{Ti}$, $G_{Ti}$, $B_{Ti}$) are multiplied by ($\Delta\gamma_R$, $\Delta\gamma_G$, $\Delta\gamma_B$) to obtain the corrected density representative signals ($R_{pi}$, $G_{pi}$, $B_{pi}$).

An improved correction factor can be obtained by comparing additional density representative digital signals over a broad range of exposures. Either a set of 3 one-dimensional look-up tables could be derived or, to achieve additional accuracy, a multidimensional look-up table could be used. In practice these approaches would use the density representative digital signal(s) ($R_{Ti}$, $G_{Ti}$, $B_{Ti}$) for each pixel of an image as an index into the look-up tables to find a new density representative signal(s) ($R_{pi}$, $G_{pi}$, $B_{pi}$) that would more closely match that set of density representative digital signals ($R_{oi}$, $G_{oi}$, $B_{oi}$) which would be achieved using a standard temperature, standard time processed negative.

Another variant of this approach would be to calculate the functional relationship between ($R_{Ti}$, $G_{Ti}$, $B_{Ti}$) and ($R_{oi}$, $G_{oi}$, $B_{oi}$) as $$f((R_{oi}, G_{oi}, B_{oi})) = g((R_{Ti}, G_{Ti}, B_{Ti}))$$

and to use this equation to calculate corrected density representative digital signals ($R_{pi}$, $G_{pi}$, $B_{pi}$) which more closely match that set of density representative digital signals ($R_{oi}$ $G_{oi}$, $B_{oi}$) which would be achieved by a standard temperature, standard time processed negative. Additional variations on this approach could include a matrix, derived by regressing the density representative digital signals achieved by the high temperature, rapidly processed negative, ($R_{Ti}$, $G_{Ti}$, $B_{Ti}$) and the desired density representative digital signals obtained from a standard temperature, standard time processed film, ($R_{oi}$, $G_{oi}$, $B_{oi}$). The matrix could also be used in combination with a set of look-up tables. The corrected density representative digital signals ($R_{pi}$, $G_{pi}$, $B_{pi}$) achieved by these approaches could then be further manipulated and/or enhanced digitally, displayed on a monitor, transmitted to a hardcopy device, or stored for use at a later date.

In another embodiment of the invention, the density representative digital signals from a high temperature, rapidly processed film ($R_{Ti}$, $G_{Ti}$, $B_{Ti}$) are obtained for a well manufactured, correctly stored and processed film exposed to a series of patches that differ in color and intensity, and are stepped in intensity over the exposure scale. These density representative digital signals are used in combination with the exposure information for the different patches to generate an interimage correction matrix ($MAT_{ii}$).

$$MAT_{ii} = \begin{vmatrix} a_1 & a_4 & a_5 \\ a_7 & a_2 & a_6 \\ a_8 & a_9 & a_3 \end{vmatrix}$$

This matrix describes the interaction between the three color records where development in one color record can influence development in one or both of the other color records. These types of interactions are well known in the photographic art and are the result of both undesired chemical interactions during development and deliberate chemical and optical interactions designed to influence the overall color reproduction of the film. The inverse of this matrix ($MAT_{ii}$)$^{-1}$, in combination with the density representative digital signal ($R_{Ti}$, $G_{Ti}$, $B_{Ti}$) of the high temperature, rapidly processed film according to this invention, can be used to calculate a channel independent density representative digital signal ($R_{ci}$, $G_{ci}$, $B_{ci}$)(representative of those densities that would have been obtained for the particular exposure if there were no interactions between layers):

$$\begin{bmatrix} R_{ci} \\ G_{ci} \\ B_{ci} \end{bmatrix} = MAT_{ii} - 1 \begin{bmatrix} R_{Ti} \\ G_{Ti} \\ B_{Ti} \end{bmatrix}.$$

The red, green and blue channel independent density representative digital signals ($R_{ci}$, $G_{ci}$, $B_{ci}$) are then converted to log(exposure or E) representative digital signals ($R_{LE}$, $G_{LE}$, $B_{LE}$) by the use of three one dimensional look-up tables. The recorded image is then in a form that is independent of the chemical processing.

The log(exposure) representative signals can now be processed in a variety of ways. They can be processed so as to achieve the color density representative digital signals ($R_{oi}$, $G_{oi}$, $B_{oi}$) which would have been achieved by a well manufactured, correctly stored and processed film of the same photographic film type that has been given identical exposures and processed in a standard temperature, standard time process. Alternatively, those signals can be processed to achieve the density representative digital signals that would have been obtained for an alternative photographic film type that has been given the same exposures and processed through a standard temperature and standard time process. The methods for these corrections include, but are not limited to, mathematical constants, linear and non-linear mathematical relationships, and look-up tables (LUT's).

It is important to remember that while the images are in the digital form the image processing is not limited to the color and tone scale corrections described above. While the image is in this form, additional image manipulation may be used including, but not limited to, standard scene balance algorithms (to determine printing corrections based on the densities of one or more areas within the negative), sharpening via convolution or unsharp masking, red-eye reduction and grain-suppression. Moreover, the image may be artistically manipulated, zoomed, cropped, combined with additional images, or other manipulations known in the art. Once the image has been corrected and any additional image processing and manipulation has occurred, the image may be written to a variety of devices including, but not limited to, silver-halide film or paper writers, thermal printers, electro-photographic printers, ink-jet printers, display monitors, CD disks and other types of storage and display devices.

The following examples are presented to illustrate, but not limit, the practice of this invention.

Materials and Methods for the Examples

The following stock color developer solution was used in the following Processing Examples 1–3:

| Water | 800 ml |
|---|---|
| Potassium carbonate, anhydrous | 34.3 g |
| Potassium bicarbonate | 2.32 g |
| Sodium sulfite, anhydrous | 0.38 g |
| Sodium metabisulfite | 2.78 g |
| Potassium iodide | 1.2 mg |
| Sodium bromide | See Table II |
| Diethylenetriaminepentaacetic acid, pentasodium salt (40% solution) | 8.43 g |
| Hydroxylamine sulfate | 2.41 g |
| 4-Amino-3-methyl-N-ethyl-N-hydroxyethyl aniline | 4.52 g |
| Water to make 1 liter (pH adjusted to 10.0) | |

The color negative film used in all of the following examples was commercially available KODAK GOLD ULTRA™ 400 color film.

Processing Examples 1–3 are intended to demonstrate the dependence of optimum color developing agent concentration with development time. This dependence precludes the use of simple rules to predict optimum color developing agent concentration independent of development time.

Processing Example 1

This example illustrates the methods used to adjust a color developer when the color developing agent concentration is held at $1.5 \times 10^{-2}$ mol/l and the level of bromide ion, pH, and processing temperature are adjusted to optimize the color developer formulation. Optimization of color developer formulation was evaluated by measuring the difference in density in color photographic films that have been exposed through a stepped neutral filter and processed either using a conventional 3 minute, 15 second color development (Control) or using the rapid color development of this invention (Invention). The absolute value of the density difference between the Invention and Control at each step in the stepped exposure and for all three color records was summed, averaged and multiplied by 10 to produce the difference response identified herein as "Δ". The "Δ" value is zero if the Invention method provides the same dye densities as the Control method.

This example illustrates a color developer formulation useful with a development time of 45 seconds. The values of the three "variables" of bromide ion concentration, pH, and development temperature were evaluated in the ranges shown in Table I below.

TABLE I

| VARIABLE | LOW | HIGH |
|---|---|---|
| temperature | 50° C. | 65° C. |
| pH | 10.1 | 10.9 |
| bromide ion | 0.022 mol/l | 0.081 mol/l |

The experimental design used to determine variable levels was a three factor central composite design. See "Statistics for Experimenters", G. Box, W. Hunter, J. Hunter, John Wiley and Sons (1978), Chapter 15, page 534.

Using the color developer described above, and ajusting temperature, pH and bromide ion concentration as described in Table II below, samples of the color negative film were exposed, color developed for 45 seconds, bleached, fixed, stabilized and dried. Bleaching, fixing and stabilization was carried out using conventional FLEXICOLOR C-41 RA™ processing conditions and solutions. The results are shown in Table II below.

TABLE II

| Film Sample | Temperature | pH | Bromide ion (mol/l) | Δ |
|---|---|---|---|---|
| 1 | 55.0 | 10.3 | 0.0417 | 1.88 |
| 2 | 60.0 | 10.3 | 0.0417 | 1.28 |
| 3 | 55.0 | 10.7 | 0.0417 | 1.84 |
| 4 | 60.0 | 10.7 | 0.0417 | 1.85 |
| 5 | 55.0 | 10.3 | 0.0612 | 2.70 |
| 6 | 60.0 | 10.3 | 0.0612 | 0.91 |
| 7 | 55.0 | 10.7 | 0.0612 | 2.44 |
| 8 | 60.0 | 10.7 | 0.0612 | 1.31 |
| 9 | 50.0 | 10.5 | 0.0515 | 4.04 |
| 10 | 65.0 | 10.5 | 0.0515 | 4.28 |
| 11 | 57.5 | 10.1 | 0.0515 | 1.90 |
| 12 | 57.5 | 10.9 | 0.0515 | 1.45 |
| 13 | 57.5 | 10.5 | 0.0223 | 1.75 |
| 14 | 57.5 | 10.5 | 0.0806 | 2.27 |
| 15 | 57.5 | 10.5 | 0.0515 | 1.28 |
| 16 | 57.5 | 10.5 | 0.0515 | 1.16 |

It is apparent from Table II that for a 45 second color development time, the minimum value of Δ occurred when the temperature of development was 60° C., the bromide ion concentration was 0.06 mol/l, and the pH was 10.3. However, as is also evident from Table II, the three variables are interdependent, with the combination determining the value of Δ. An example of this interdependence is illustrated in FIGS. 1A–1D.

FIGS. 1A–1D are illustrations of the response surfaces generated from the modeled data of Processing Example 1. See "Statistics for Experimenters" chapter 15, section 4, G. Box, W. Hunter, J. Hunter, John Wiley and Sons (1978). These response surfaces show the interdependence of the variables and allow selection of an optimum developer formulation at a desired color development time. In each instance, the time of development was 45 seconds, but the bromide ion level was varied as follows: 0.0223 mol/l for data shown in FIG. 1A, 0.0417 mol/l for data shown in FIG. 1B, 0.0612 mol/l for data shown in FIG. 1C, and 0.0806 mol/l for data shown in FIG. 1D.

Processing Example 2

The color developers and procedures used in Processing Example 1 were used for this Example also, except that the color development time was 30 seconds. The resulting "Δ" values are given in TABLE III below.

TABLE III

| Film Sample | Temperature | pH | Bromide ion (mol/l) | Δ |
|---|---|---|---|---|
| 1 | 55.0 | 10.3 | 0.0417 | 4.33 |
| 2 | 60.0 | 10.3 | 0.0417 | 2.76 |
| 3 | 55.0 | 10.7 | 0.0417 | 4.18 |
| 4 | 60.0 | 10.7 | 0.0417 | 2.98 |
| 5 | 55.0 | 10.3 | 0.0612 | 4.88 |
| 6 | 60.0 | 10.3 | 0.0612 | 3.56 |
| 7 | 55.0 | 10.7 | 0.0612 | 4.71 |
| 8 | 60.0 | 10.7 | 0.0612 | 3.07 |
| 9 | 50.0 | 10.5 | 0.0515 | 5.68 |
| 10 | 65.0 | 10.5 | 0.0515 | 1.66 |
| 11 | 57.5 | 10.1 | 0.0515 | 4.34 |
| 12 | 57.5 | 10.9 | 0.0515 | 3.46 |
| 13 | 57.5 | 10.5 | 0.0223 | 2.84 |
| 14 | 57.5 | 10.5 | 0.0806 | 4.61 |
| 15 | 57.5 | 10.5 | 0.0515 | 3.65 |
| 16 | 57.5 | 10.5 | 0.0515 | 3.97 |

It is apparent from TABLE III that for a color development time of 30 seconds, the minimum value of "Δ" occurred when the development temperature was 60° C., the bromide ion concentration was 0.05 and the pH was 10.5. Analysis of the response surfaces for the 30 second development time, as shown in FIGS. 2A–2D, demonstrates a large dependence on development temperature and a lesser dependence on pH or bromide ion concentration. The bromide ion concentration was varied as follows: 0.0223 mol/l for data shown in FIG. 2A, 0.0417 mol/l for data shown in FIG. 2B, 0.0612 mol/l for data shown in FIG. 2C, and 0.0806 mol/l for data shown in FIG. 2D.

Processing Example 3

The color developing solutions and procedures used in Processing Example 1 were also used in this Example, except that the color development time was 60 seconds. The resulting "Δ" values are given in TABLE IV below.

TABLE IV

| Film Sample | Temperature | pH | Bromide ion (mol/l) | Δ |
|---|---|---|---|---|
| 1 | 55.0 | 10.3 | 0.0417 | 1.05 |
| 2 | 60.0 | 10.3 | 0.0417 | 3.37 |
| 3 | 55.0 | 10.7 | 0.0417 | 1.31 |
| 4 | 60.0 | 10.7 | 0.0417 | 4.96 |
| 5 | 55.0 | 10.3 | 0.0612 | 0.78 |
| 6 | 60.0 | 10.3 | 0.0612 | 2.11 |
| 7 | 55.0 | 10.7 | 0.0612 | 0.96 |
| 8 | 60.0 | 10.7 | 0.0612 | 3.48 |
| 9 | 50.0 | 10.5 | 0.0515 | 2.65 |
| 10 | 65.0 | 10.5 | 0.0515 | 8.41 |
| 11 | 57.5 | 10.1 | 0.0515 | 0.80 |
| 12 | 57.5 | 10.9 | 0.0515 | 2.81 |
| 13 | 57.5 | 10.5 | 0.0223 | 3.93 |
| 14 | 57.5 | 10.5 | 0.0806 | 0.82 |
| 15 | 57.5 | 10.5 | 0.0515 | 1.69 |
| 16 | 57.5 | 10.5 | 0.0515 | 1.67 |

It is apparent from TABLE IV that for a 60 second color development time, the minimum value of "Δ" occurred when the development temperature was 57.5° C., the bromide ion concentration was 0.06 mol/l, and the pH was 10.3. The interdependencies of the variables at 60° C. are illustrated in FIGS. 3A–3D. The 60 second development time required a different set of development conditions than the 30 or 45 second development times of Processing Examples 1 and 2 to produce a minimum difference between the Invention and Control methods. The bromide ion concentration was 0.0223 mol/l for data shown in FIG. 3A, 0.0417 mol/l for data shown in FIG. 3B, 0.0612 mol/l for data shown in FIG. 3C, and 0.0806 mol/l for data shown in FIG. 3D.

It is evident from Processing Examples 1, 2, and 3 that a simple rule can not provide a color developer formulation that can be optimized for matching color records. To minimize the difference between a conventional process and one using shorter color development times, it is necessary to adjust several of the color developer components and conditions simultaneously. This reformulation is also necessary when the development time is changed. The most economic method of doing this is to use designed experiments and statistical analysis.

The following Processing Examples 4 and 5 illustrate the practice of this invention to adjust the color developer formulation when the color developing agent concentration is also a variable. They also serve to illustrate the complex nature of the color developer solution component interactions on optimum photographic response.

Processing Example 4

This example illustrates a method to adjust the color developer solution formulations when second order interactions of variables are suspected and economy of effort is desired. Designs with at least three levels of the variables are required to estimate curvature in a response surface. A full four factor, three level factorial experiment requires far too many runs (81) to be practical. The central composite design used in Processing Examples 1–3 above can be used to estimate these quadratic terms, and a four factor experiment requires only 25 runs. However, the Box-Behnken design [see "Empirical Model-Building and Response Surfaces" G. Box, N. Draper, John Wiley and Sons (1987) chapter 15] also estimates the quadratic terms while rotating the design to sample away from the edges of the design, and requires 25 runs. The Box-Behnken design was used for Processing Example 4.

The four "variables" of color developing agent concentration, bromide ion concentration, pH, and development temperature were evaluated in the ranges shown in TABLE V below.

TABLE V

| Variable | Low | High |
|---|---|---|
| Color Developing agent (mol/l) | 0.0154 | 0.0497 |
| Temperature (°C.) | 45 | 55 |
| pH | 10.5 | 11.5 |
| Bromide ion (mol/l) | 0.0126 | 0.0903 |

The following color developer solutions were prepared for use in the experiments described below:

| Compound | Amount |
|---|---|
| Water | 800 ml |
| Potassium carbonate, anhydrous | 34.3 g |
| Potassium bicarbonate | 2.32 g |
| Sodium Sulfite, anhydrous | 0.38 g |
| Sodium metabisulfite | 2.78 g |
| Potassium iodide | 1.20 mg |
| Diethylenetriaminepentaacetic acid pentasodium salt (40% solution) | 8.43 g |
| Hydroxylamine sulfate | 2.41 g |
| Sodium bromide | Given in TABLE VI below |

-continued

| Compound | Amount |
| --- | --- |
| 4-Amino-3-methyl-N-ethyl-N-hydroxyethyl aniline | Given in TABLE VI below |
| Water to make | 1.0 liter |

Using these color developer solutions, adjusted to the temperature and pH shown in TABLE VI, samples of color photographic film were exposed, color developed for 45 seconds, bleached, fixed, stabilized, and dried. Bleaching, fixing and stabilization was carried out using conventional FLEXICOLOR C-41 RA™ Process conditions and solutions. The resulting "$\Delta$" values for each film sample are shown in TABLE VI below.

TABLE VI

| Film Sample | Temperature | pH | Developing Agent (mol/l) | Bromide ion (mol/l) | $\Delta$ |
| --- | --- | --- | --- | --- | --- |
| 1 | 55 | 11.5 | 0.0325 | 0.0515 | 16.66 |
| 2 | 55 | 10.5 | 0.0325 | 0.0515 | 1.32 |
| 3 | 45 | 11.5 | 0.0325 | 0.0515 | 3.76 |
| 4 | 45 | 10.5 | 0.0325 | 0.0515 | 5.05 |
| 5 | 50 | 11.0 | 0.0497 | 0.0903 | 2.04 |
| 6 | 50 | 11.0 | 0.0497 | 0.0126 | 6.17 |
| 7 | 50 | 11.0 | 0.0154 | 0.0903 | 5.11 |
| 8 | 50 | 11.0 | 0.0154 | 0.0126 | 2.48 |
| 9 | 55 | 11.0 | 0.0325 | 0.0903 | 1.86 |
| 10 | 55 | 11.0 | 0.0325 | 0.0126 | 7.47 |
| 11 | 45 | 11.0 | 0.0325 | 0.0903 | 4.91 |
| 12 | 45 | 11.0 | 0.0325 | 0.0126 | 2.20 |
| 13 | 50 | 11.5 | 0.0497 | 0.0515 | 9.73 |
| 14 | 50 | 11.5 | 0.0154 | 0.0515 | 2.61 |
| 15 | 50 | 10.5 | 0.0497 | 0.0515 | 1.51 |
| 16 | 50 | 10.5 | 0.0154 | 0.0515 | 4.99 |
| 17 | 55 | 11.0 | 0.0497 | 0.0515 | 8.33 |
| 18 | 55 | 11.0 | 0.0154 | 0.0515 | 1.94 |
| 19 | 45 | 11.0 | 0.0497 | 0.0515 | 2.53 |
| 20 | 45 | 11.0 | 0.0154 | 0.0515 | 5.67 |
| 21 | 50 | 11.5 | 0.0325 | 0.0903 | 14.60 |
| 22 | 50 | 11.5 | 0.0325 | 0.0126 | 11.30 |
| 23 | 50 | 10.5 | 0.0325 | 0.0903 | 3.95 |
| 24 | 50 | 10.5 | 0.0325 | 0.0126 | 1.52 |
| 25 | 50 | 11.0 | 0.0325 | 0.0515 | 2.31 |

Because of the complexity of this experimental design, the response surfaces cannot be easily visualized. It is possible to hold two of the factors constant and construct a response surface from the other two. This is useful as an estimate of the response surface structure, however, the preferred method is to do a computational co-optimization of the polynomial model. The model for this experiment contains fourteen terms and a constant. Analysis of variance (ANOVA) of the model set the probability of the model being wrong at 0.3%. The most important terms in the model in order of importance were pH, the cross term Temperature*pH, pH squared, the cross terms pH*Developing Agent, Temperature*Developing Agent, Temperature*Bromide, and the main effect of Temperature. Added color developing agent and bromide ion were only important in the above cross terms, as the main effects of these two factors were not significant in the model. As is evident from the model, the optimum color developer composition is very dependent on interactions between the composition variables. The optimum color developer composition could not have been determined by changing only one factor at a time or by a simple rule specifying the color developing agent level and development temperature as a function of the bromide ion level. When a grid search co-optimization routine was run on the model, two regions with low "$\Delta$" values were found. One region was at $1.54 \times 10^{-2}$ mol/l of color developing agent, $5.15 \times 10^{-2}$ mol/l bromide ion, a pH of 10.5 and 55° C. development temperature. The second region was at $4.97 \times 10^{-2}$ mol/l color developing agent, $9.03 \times 10^{-2}$ mol/l bromide ion, a pH of 10.5 and 55° C. development temperature. These two regions are only conditional optima as they both reside on the extremes of the experimental space. In this case the true optima could be outside the experimental space tested. However, it is evident from this experiment that more than one optimum position can exist for a given development time. Identification of these multiple optima would not have been possible using simpler experimental procedures.

Processing Example 5

This example illustrates the methods used to identify optimal development conditions using linked experimental designs. As noted in Processing Example 4, two regions were identified as possible optima. The region where the color developer agent level in the developing solution was low was evaluated as in Processing Example 1, the region where the color developer agent level was high was examined in this Example which was designed with the variable levels shown in TABLE VII below.

TABLE VII

| Variable | Low Axial | Low Factor | Center Point | High Factor | High Axial |
| --- | --- | --- | --- | --- | --- |
| Temperature (°C.) | 50 | 52.5 | 55 | 57.5 | 60 |
| pH | 10.1 | 10.3 | 10.5 | 10.7 | 10.9 |
| Bromide Ion (mol/l) | 0.0320 | 0.0515 | 0.0709 | 0.0903 | 0.1100 |
| Developing Agent (mol/l) | 0.0223 | 0.0295 | 0.0360 | 0.0428 | 0.0497 |

The following color developer solutions were prepared and used in this example:

| Compound | Amount |
| --- | --- |
| Water | 800 ml |
| Potassium carbonate, anhydrous | 34.3 g |
| Potassium bicarbonate | 2.32 g |
| Sodium Sulfite, anhydrous | 0.38 g |
| Sodium metabisulfite | 2.78 g |
| Potassium iodide | 1.20 mg |
| Diethylenetriaminepentaacetic acid pentasodium salt (40% solution) | 8.43 g |
| Hydroxylamine sulfate | 2.41 g |
| Sodium bromide | Given in TABLE VIII below |
| 4-Amino-3-methyl-N-ethyl-N-hydroxyethyl aniline | Given in TABLE VIII below |
| Water to make | 1.0 liter |

Using these color developer solutions, and adjusted to the temperature and pH shown in TABLE VIII, samples of color photographic film were exposed, developed for 45 seconds, bleached, fixed, stabilized, and dried. Bleaching, fixing and stabilization were carried out using conventional FLEXICOLOR Process C-41 RA™ conditions and solutions. The resulting "$\Delta$" values for each film sample are shown in TABLE VIII below.

TABLE VIII

| Film Sample | Temperature | pH | Bromide Ion (mol/l) | Developing Agent (mol/l) | Δ |
|---|---|---|---|---|---|
| 1 | 52.5 | 10.3 | 0.0515 | 0.0295 | 3.60 |
| 2 | 57.5 | 10.3 | 0.0515 | 0.0295 | 1.61 |
| 3 | 52.5 | 10.7 | 0.0515 | 0.0295 | 3.08 |
| 4 | 57.5 | 10.7 | 0.0515 | 0.0295 | 1.35 |
| 5 | 52.5 | 10.3 | 0.0903 | 0.0295 | 4.33 |
| 6 | 57.5 | 10.3 | 0.0903 | 0.0295 | 2.52 |
| 7 | 52.5 | 10.7 | 0.0903 | 0.0295 | 4.03 |
| 8 | 57.5 | 10.7 | 0.0903 | 0.0295 | 2.02 |
| 9 | 52.5 | 10.3 | 0.0515 | 0.0428 | 2.17 |
| 10 | 57.5 | 10.3 | 0.0515 | 0.0428 | 1.15 |
| 11 | 52.5 | 10.7 | 0.0515 | 0.0428 | 1.62 |
| 12 | 57.5 | 10.7 | 0.0515 | 0.0428 | 1.79 |
| 13 | 52.5 | 10.3 | 0.0903 | 0.0428 | 3.73 |
| 14 | 57.5 | 10.3 | 0.0903 | 0.0428 | 1.24 |
| 15 | 52.5 | 10.7 | 0.0903 | 0.0428 | 2.96 |
| 16 | 57.5 | 10.7 | 0.0903 | 0.0428 | 1.26 |
| 17 | 50.0 | 10.5 | 0.0709 | 0.0360 | 4.24 |
| 18 | 60.0 | 10.5 | 0.0709 | 0.0360 | 1.59 |
| 19 | 55.0 | 10.1 | 0.0709 | 0.0360 | 2.81 |
| 20 | 55.0 | 10.9 | 0.0709 | 0.0360 | 1.25 |
| 21 | 55.0 | 10.5 | 0.0320 | 0.0360 | 1.21 |
| 22 | 55.0 | 10.5 | 0.1100 | 0.0360 | 3.52 |
| 23 | 55.0 | 10.5 | 0.0709 | 0.0223 | 3.73 |
| 24 | 55.0 | 10.5 | 0.0709 | 0.0497 | 1.33 |
| 25 | 55.0 | 10.5 | 0.0709 | 0.0360 | 2.32 |

Like the Box-Behnken design in Processing Example 4, the complexity of this Processing Example made visualization of the response surfaces difficult. The preferred method of analysis was a computational co-optimization of the polynomial model. Analysis of variance (ANOVA) set the provability of the model being wrong at 0.2%. The most important terms in the model in order of importance were development temperature, color developing agent level, bromide ion level and pH. Co-optimization of the "Δ" response gave preferred conditions for 45 second development of 0.051 mol/l bromide ion, 0.049 mol/l color developing agent, a pH of 10.8 and a development temperature of 51° C.

It is clear from the foregoing Processing Examples 4 and 5, that to adequately optimize color developer composition, it is necessary to consider all concentrations that modify development-, development temperature, and the required development time. This multi-factor analysis was most conveniently done using designed experiments and statistical analysis.

Examples 1–9 are provided to illustrate the various color developer solutions that can be used to generate color negative photographic materials suitable for scanning and digital correction according to the practice of this invention. Samples of color negative film were exposed to a series of neutral density and color patches sufficient for measuring the necessary photographic parameters and calculating the transformations needed for calibration to scene log (exposure) and interimage correction. One set of the exposed film samples were processed using the standard FLEXICOLOR C-41 RA™ process (37.8° C., development time of 3 minutes and 15 seconds). These processed film samples were then used as the comparative example (Control) for the following Examples 1–9.

EXAMPLE 1

This example illustrates the process variations and digital calibrations necessary when high levels of bromide ion are used in the processing solution. The optimized color developer solution is shown in TABLE IX below.

TABLE IX

| Compound | Amount |
|---|---|
| Water | 800 ml |
| Sodium carbonate, anhydrous | 18.6 g |
| Potassium carbonate, anhydrous | 34.3 g |
| Potassium bicarbonate | 2.32 g |
| Sodium Sulfite, anhydrous | 0.38 g |
| Sodium metabisulfate | 2.78 g |
| Potassium iodide | 1.20 mg |
| Diethylenetriaminepentaacetic acid pentasodium salt (40% solution) | 8.43 g |
| Hydroxyamine sulfate | 2.41 g |
| Sodium bromide | 20 g |
| 4-Amino-3-methyl-N-ethyl-N-hydroxylethyl aniline | 10.0 g |
| Water to make | 1.0 liter |

The color developer solution was adjusted to pH 10.0 and heated to 60° C. Imagewise exposed samples of color film were developed for 45 seconds, bleached, fixed and stabilized using FLEXICOLOR C-41 RA™ solutions and conditions, and dried.

The developed color negative samples were then optically printed using an enlarger calibrated to match a neutral density of 0.60±0.03 for a specific target. The average standard deviations of resulting Status A density differences between the optical prints from a color negative film processed in the high temperature process of this invention and the optical prints from a color negative film processed in the standard FLEXICOLOR C-41 RA™ process were calculated from the following equations for the set of color patches of varying density and hue:

$$S_R = \sqrt{\frac{\sum_{1}^{n}(R_A - R_E)^2}{n-1}}$$

$$S_G = \sqrt{\frac{\sum_{1}^{n}(G_A - G_E)^2}{n-1}}$$

$$S_B = \sqrt{\frac{\sum_{1}^{n}(B_A - B_E)^2}{n-1}}$$

The sample standard deviations of the three color records were then averaged using the equation:

$$\overline{S}_{avg} = \frac{S_R + S_G + S_B}{3}$$

to give an indication of the overall differences in color and tone scale reproduction between the two systems. These data are tabulated in TABLE X ($\overline{S}_{ave}$). The data indicate that the color negative film processed in the manner described above results in a reduced quality final image. This difference in output color reproduction would be present for any light-sensitive output material.

However, the differences in color and tone scale can be measured and used to derive a digital correction factor that would result in a closer match between display images based on a color negative film processed in the standard FLEXICOLOR C-41 RA™ Process and the color negative film processed in the method of this invention. As described hereinabove, there are a number of ways of deriving the correction factor and the use of a particular method in these examples is not intended to limit the means that may be used to calculate the correction factor. In this example, the films being calibrated were given a series of known exposures, including neutral patches of varying densities, and a variety of combinations of red, green and blue exposures.

The exposed film samples were then processed as described above to form negative film images having cyan, magenta and yellow dye densities which varied in an image-wise fashion. A digital representation of these negatives were obtained by means of a conventional optoelectronic scanner. The details of creating this digital representation are well known in the art. The scanner density representative density signals for each pixel may be described as $R_{SD}$, $G_{SD}$ and $B_{SD}$.

In conventional color negative films, there are significant interactions between the different color records where the development in one color record may affect the density achieved in the other color records. A matrix describing these interactions between color records may be derived from the scanner density representative digital signals ($R_{SD}$, $G_{SD}$, $B_{SD}$) of the various patches and the exposures used to generate the patches using standard regression techniques. This matrix may be thought of as describing the transformation of digital channel independent density signals ($R_{CI}$, $G_{CI}$, $B_{CI}$) (those densities which would have formed if there were no interactions between the color records) to the scanner density representative digital signals ($R_{SD}$, $G_{SD}$, $B_{SD}$) (i.e., the densities that formed including the interactions between the different color records). The inverse of this matrix was also calculated. This second matrix converts scanner density representative digital signals ($R_{SD}$, $G_{SD}$, $B_{SD}$) to channel independent density representative digital signals ($R_{CI}$, $G_{CI}$, $B_{CI}$). The equation below describes the calculation of channel independent densities for the test film when processed as described above. The matrix shown is a 3×3 matrix. Obviously, more precision could be obtained with a higher order matrix or a multidimensional lookup table.

$$\begin{bmatrix} R_{CI} \\ G_{CI} \\ B_{CI} \end{bmatrix} = \begin{bmatrix} 1.0897 & 0.0088 & -0.0985 \\ 0.0616 & 1.0214 & -0.0830 \\ -0.1777 & -0.0129 & 1.1905 \end{bmatrix} \begin{bmatrix} R_{SD} \\ G_{SD} \\ B_{SD} \end{bmatrix}$$

Figure 4:
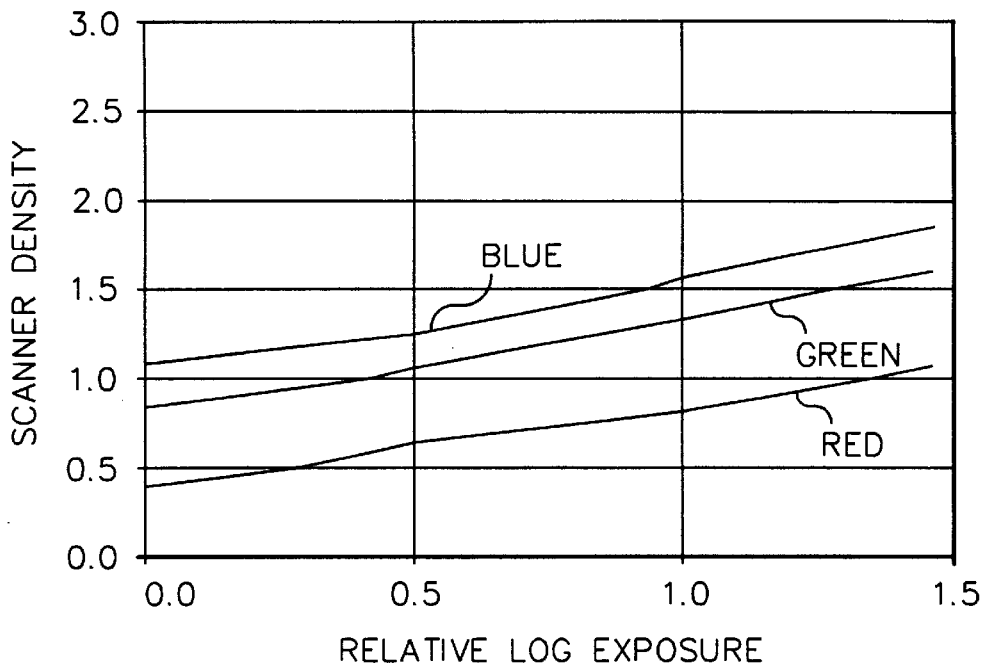
FIG. 4 is a graphical plot of scanner density vs. log E (exposure) as described in Example 1 below.

The scanner density representative digital signals ($R_{SD}$, $G_{SD}$, $B_{SD}$) obtained for a broad range of neutral exposures, were combined with their known exposures to describe a film characteristic curves [scanner density vs. relative log (exposure) curve] for the three color records as shown in FIG. 4. The scanner density representative digital signals ($R_{SD}$, $G_{SD}$, $B_{SD}$) of the film characteristic curve were then converted to channel independent density representative digital signals ($R_{CI}$, $G_{CI}$, $B_{CI}$) using the equation shown above. This is desirable because there is a one to one relationship between log(exposure) and the channel independent density representative digital signals. The channel independent density digital signal ($R_{CI}$, $G_{CI}$, $B_{CI}$) vs. log (exposure) curves were then inverted to form log(exposure) vs. channel independent density digital signal ($R_{CI}$, $G_{CI}$, $B_{CI}$) curves. The curves for the three color records can be thought of as a series of 1-dimensional look-up tables that convert channel independent density digital signals ($R_{CI}$, $G_{CI}$, $B_{CI}$) to digital log(exposure) representative signals ($R_{LE}$, $G_{LE}$, $B_{LE}$).

The scanner density representative digital signals ($R_{SD}$, $G_{SD}$, $B_{SD}$) were converted to the log(exposure) representative digital signals ($R_{LE}$, $G_{LE}$, $B_{LE}$) of an image in the following manner. The scanner density representative digital signals ($R_{SD}$, $G_{SD}$, $B_{SD}$) were converted to channel independent density digital signals ($R_{CI}$, $G_{CI}$, $B_{CI}$) by using the matrix shown above. The channel independent density digital signals ($R_{CI}$, $G_{CI}$, $B_{CI}$) are then converted to digital log(exposure) representative digital signals ($R_{LE}$, $G_{LE}$, $B_{LE}$) of an image. The digitized image was now in a form that was independent of the chemical processing used to form the dye density image. The means for producing desirable output from scene log(exposures) is well known in the art. The log(exposure) representative digital signals ($R_{LE}$, $G_{LE}$, $B_{LE}$) could then be transformed in a variety of ways to produce desirable output. If the desire is to explicitly match the image that would have been produced had the color negative film been processed with standard FLEXICOLOR C-41 RA™ chemistry, the calculated log(exposure) representative digital signals ($R_{LE}$, $G_{LE}$, $B_{LE}$) can be transformed through a model of the interlayer interactions and tone scale associated with the specific film processed through the standard process, resulting in a description of the image in terms of aim film density representative digital signals ($R_{AIM}$, $G_{AIM}$, $B_{AIM}$). These aim film density representative digital signals ($R_{AIM}$, $G_{AIM}$I $B_{AIM}$) can then be processed as appropriate for the desired output device. This was done and the average standard deviation resulting from Status A density differences between an image formed from a color negative processed using the high temperature, short time method of this invention and the image formed from a negative processed in the standard process were calculated from the above equations and is tabulated in the third column of TABLE X below.

EXAMPLE 2

Use of Developer With No Bromide Ion

This example illustrates the process variations and digital calibrations necessary when bromide ion is not included in the color developer solution, shown as follows:

| Compound | Amount |
| --- | --- |
| Water | 800 ml |
| Sodium carbonate, anhydrous | 18.6 g |
| Potassium carbonate, anhydrous | 34.3 g |
| Potassium bicarbonate | 2.32 g |
| Sodium Sulfite, anhydrous | 0.38 g |
| Sodium metabisulfate | 2.78 g |
| Potassium iodide | 1.20 mg |
| Diethylenetriaminepentaacetic acid pentasodium salt (40% solution) | 8.43 g |
| Hydroxylamine sulfate | 2.41 g |
| 4-Amino-3-methyl-N-ethyl-N-hydroxyethyl aniline | 4.0 g |
| Water to make | 1.0 liter |

The color developer solution was adjusted to a pH of 10.0 and heated to 50° C. Imagewise exposed samples of film were developed for 45 seconds, bleached, fixed, and stabilized using FLEXICOLOR C-41 RA™ solutions and conditions, and dried.

The developed color negative samples were then optically printed using an enlarger calibrated to match a neutral density of 0.60±0.03 for a specific patch of the target. The average standard deviation resulting from Status A density differences between the optical prints from a color negative film processed using the high temperature development and the optical prints from a color negative film processed using the standard FLEXICOLOR C-41 RA™ process is shown in TABLE X below.

Figure 5:
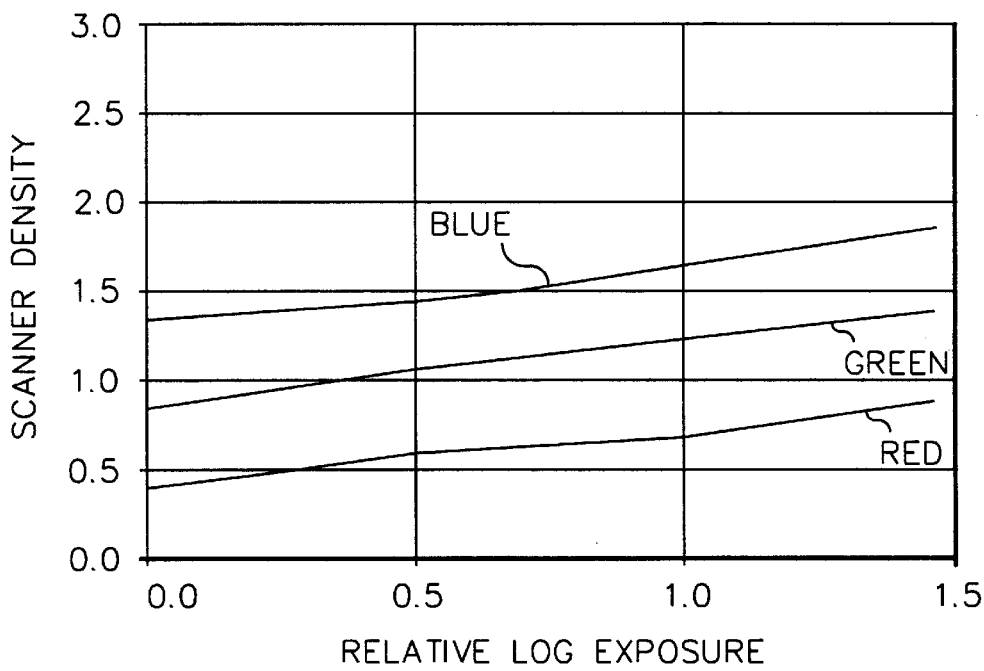
FIG. 5 is a graphical plot of scanner density vs. log E as described in Example 2 below.

The color negatives that were color developed at high temperature were then scanned and digitally corrected using a correction factor calculated in the manner described in Example 1 above. For this particular processing formulation there were, as expected, differences in the chemical interactions between the different color records and differences in the film's characteristic curve. The test film's characteristic curves for each color record, resulting from this process can be seen in FIG. 5.

The following matrix shows the conversion of scanner density representative digital signals ($R_{SD}$, $G_{SD}$, $B_{SD}$) to channel independent density representative digital signals ($R_{CI}$, $G_{CI}$, $B_{CI}$) for the film processed through the chemistry described above. The average standard deviation resulting from Status A density differences between an image formed from a color negative processed using the high temperature, short time color development described above and the image formed from a color negative processed in standard FLEXICOLOR C-41 RA™ chemistry is tabulated in the third column of TABLE X.

$$\begin{bmatrix} R_{CI} \\ G_{CI} \\ B_{CI} \end{bmatrix} = \begin{bmatrix} 0.9231 & 0.0984 & -0.0215 \\ 0.1144 & 0.8252 & -0.0604 \\ -0.0503 & -0.0256 & 1.0760 \end{bmatrix} \begin{bmatrix} R_{SD} \\ G_{SD} \\ B_{SD} \end{bmatrix}$$

EXAMPLE 3

This example illustrates the process variations and digital calibrations necessary when the color developer is maintained at high pH. The optimized color developer solution is shown as follows:

| Compound | Amount |
| --- | --- |
| Water | 800 ml |
| Dibasic Sodium phosphate, anhydrous | 14.2 g |
| Potassium carbonate, anhydrous | 34.3 g |
| Potassium bicarbonate | 2.32 g |
| Sodium Sulfite, anhydrous | 0.38 g |
| Sodium metabisulfate | 2.78 g |
| Potassium iodide | 1.20 mg |
| Diethylenetriaminepentaacetic acid pentasodium salt (40% solution) | 8.43 g |
| Hydroxylamine sulfate | 2.41 g |
| Sodium bromide | 15.0 g |
| 4-Amino-3-methyl-N-ethyl-N-hydroxyethyl aniline | 4.0 g |
| Water to make | 1.0 liter |

The color developer solution was adjusted to pH 12.0 and heated to 45° C. Imagewise exposed samples of film were developed for 45 seconds, bleached, fixed, and stabilized using FLEXICOLOR C-41 RA™ solutions and conditions, and dried.

The developed color negative film samples were then optically printed using an enlarger calibrated to match a neutral density of 0.60±0.03 for a specific patch of the target. The average standard deviation resulting from Status A density differences between the optical prints from a color negative processed using high temperature color development of this invention and the optical prints from a color negative processed using the standard FLEXICOLOR C-41™ process is shown in TABLE X below.

Figure 6:
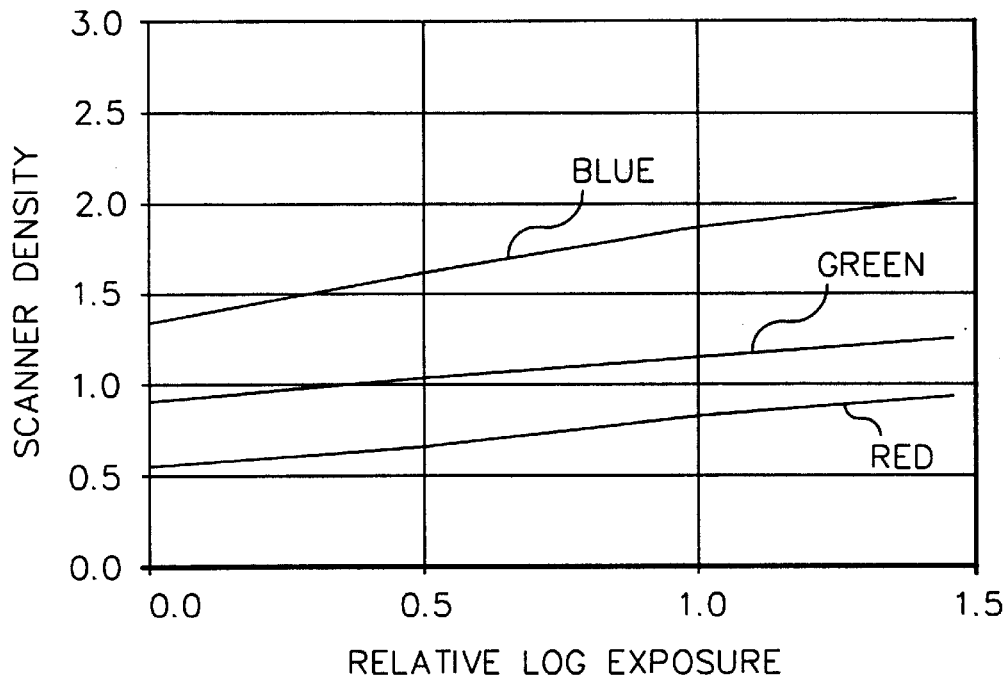
FIG. 6 is a graphical plot of scanner density vs. log E as described in Example 3 below.

The high temperature color developed negative films were then scanned and digitally corrected using a correction factor calculated in the manner described in Example 1 above. For this particular color developer there were, as expected, differences in the chemical interactions between the different color records and differences in the film's characteristic curve. The test film's characteristic curves resulting from this process, for each color record, can be seen in FIG. 6.

The following matrix shows the conversion of scanner density representative digital signals ($R_{SD}$, $G_{SD}$, $B_{SD}$) to channel independent density representative digital signals ($R_{CI}$, $G_{CI}$, $B_{CI}$) for the test film processed through the chemistry described above. The average standard deviation resulting from Status A density differences between an image formed from a negative film processed using the high temperature, short time color development of this invention and the image formed from a negative film processed in standard FLEXICOLOR C-41™ chemistry is tabulated in the third column of TABLE X.

$$\begin{bmatrix} R_{CI} \\ G_{CI} \\ B_{CI} \end{bmatrix} = \begin{bmatrix} 0.7445 & 0.2286 & 0.0268 \\ -0.0423 & 1.0112 & 0.0311 \\ -0.2767 & -0.3094 & 1.5861 \end{bmatrix} \begin{bmatrix} R_{SD} \\ G_{SD} \\ B_{SD} \end{bmatrix}$$

EXAMPLE 4

This example illustrates the process variations and digital calibrations necessary when the color developer is maintained at low pH. The optimized color developer solution was as follows:

| Compound | Amount |
| --- | --- |
| Water | 800 ml |
| Sodium Borate, 10-hydrate | 28.6 g |
| Potassium carbonate, anhydrous | 34.3 g |
| Potassium bicarbonate | 2.32 g |
| Sodium Sulfite, anhydrous | 0.38 g |
| Sodium metabisulfate | 2.78 g |
| Potassium iodide | 1.20 mg |
| Diethylenetriaminepentaacetic acid pentasodium salt (40% solution) | 8.43 g |
| Hydroxylamine sulfate | 2.41 g |
| Sodium bromide | 5.0 g |
| 4-Amino-3-methyl-N-ethyl-N-hydroxyethyl aniline | 8.0 g |
| Water to make | 1.0 liter |

The color developer solution was adjusted to pH 9.0 and heated to 60° C. Imagewise exposed film samples were developed for 45 seconds, bleached, fixed and stabilized using standard FLEXICOLOR C-41 RA™ conditions and solutions, and dried.

The developed color negative film samples were then optically printed using an enlarger calibrated to match a neutral density of 0.60±0.03 for a specific patch of the target. The average standard deviation resulting from Status A density differences between the optical prints from color negative film developed using the high temperature process of this invention, and the optical prints from a color negative film processed using standard FLEXICOLOR C-41 RA™ process is shown in TABLE X below.

Figure 7:
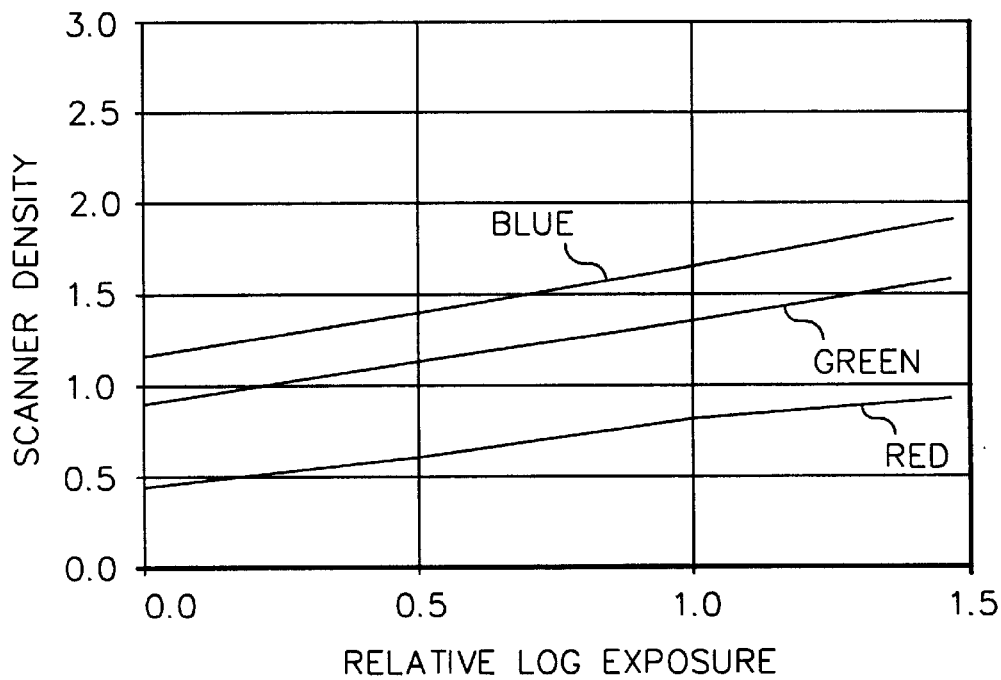
FIG. 7 is a graphical plot of scanner density vs. log E as described in Example 4 below.

The high temperature color developed films were then scanned and digitally corrected using a correction factor calculated in the manner described in Example 1 above. For this particular example there were, as expected, differences in the chemical interactions between the different color records and differences in the film's characteristic curve. The test film's characteristic curves resulting from this process, for each color record, are seen in FIG. 7. The following matrix shows the conversion of scanner density representative digital signals ($R_{SD}$, $G_{SD}$, $B_{SD}$) to channel independent density representative digital signals ($R_{CI}$, $G_{CI}$, $B_{CI}$) for the test film processed using the chemistry described above. The average standard deviation resulting from Status A density differences between an image formed from a color negative film developed using the high temperature, short time method of this invention and the image formed from a color negative film processed using standard FLEXICOLOR C-41 RA™ chemistry is tabulated in the third column of TABLE X.

$$\begin{bmatrix} R_{CI} \\ G_{CI} \\ B_{CI} \end{bmatrix} = \begin{bmatrix} 1.0537 & -0.0169 & -0.0368 \\ 0.0432 & 0.9762 & -0.0194 \\ -0.1841 & -0.1220 & 1.3061 \end{bmatrix} \begin{bmatrix} R_{SD} \\ G_{SD} \\ B_{SD} \end{bmatrix}$$

EXAMPLE 5

This example illustrates the process variations and digital calibrations necessary when high levels of color developing agent are used in the color developer. The optimized color developer solution was as follows:

| Compound | Amount |
| --- | --- |
| Water | 800 ml |
| Dibasic Sodium phosphate, anhydrous | 14.2 g |
| Potassium carbonate, anhydrous | 34.3 g |
| Potassium bicarbonate | 2.32 g |
| Sodium Sulfite, anhydrous | 0.38 g |
| Sodium metabisulfate | 2.78 g |
| Potassium iodide | 1.20 mg |
| Diethylenetriaminepentaacetic acid pentasodium salt (40% solution) | 8.43 g |
| Hydroxylamine sulfate | 2.41 g |
| Sodium bromide | 5.0 g |
| 4-Amino-3-methyl-N-ethyl-N-hydroxyethyl aniline | 20.0 g |
| Water to make | 1.0 liter |

The color developer solution was adjusted to pH 10.5 and heated to 50° C. Imagewise exposed samples of film were developed for 45 seconds, bleached, fixed, and stabilized using conventional FLEXICOLOR C-41 RA™ solutions and conditions, and dried.

The developed color negative samples were then optically printed using an enlarger calibrated to match a neutral density of 0.60±0.03 for a specific patch of the target. The average standard deviation resulting from Status A density differences between the optical prints from a color negative processed in the above high temperature process and the optical prints from a color negative processed using the standard FLEXICOLOR C-41 RA™ process is shown in TABLE X below.

Figure 8:
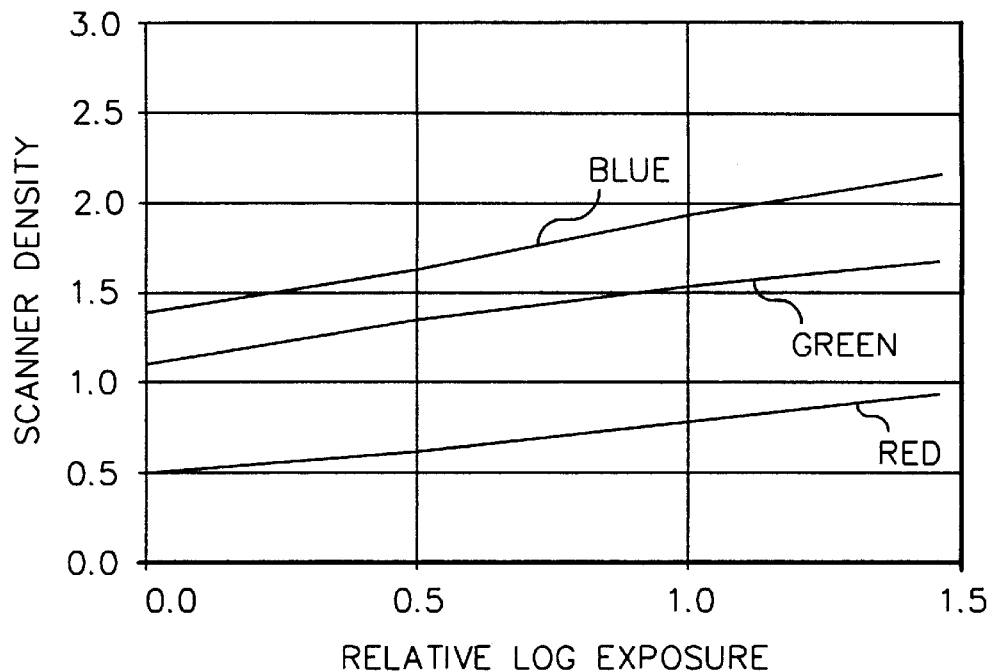
FIG. 8 is a graphical plot of scanner density vs. log E as described in Example 5 below.

The high temperature processed color negatives were then scanned and digitally corrected using a correction factor calculated in the manner described in Example 1 above. For this particular processing formulation there were, as expected, differences in the chemical interactions between the different color records and differences in the film's characteristic curve. The test film's characteristic curves resulting from this process, for each color record, are seen in FIG. 8. The matrix below shows the conversion of scanner density representative digital signals ($R_{SD}$, $G_{SD}$, $B_{SD}$) to channel independent density representative digital signals ($R_{CI}$, $G_{CI}$, $B_{CI}$) for the test film processed using the chemistry described above. The average standard deviation resulting from Status A density differences between an image formed from a color negative processed using the high temperature, short time method described above and the image formed from a color negative processed using standard FLEXICOLOR C-41 RA™ chemistry is tabulated in the third column of TABLE X below.

$$\begin{bmatrix} R_{CI} \\ G_{CI} \\ B_{CI} \end{bmatrix} = \begin{bmatrix} 1.0303 & 0.0333 & -0.0636 \\ 0.0460 & 1.0552 & -0.1012 \\ -0.2738 & -0.1764 & 1.4502 \end{bmatrix} \begin{bmatrix} R_{SD} \\ G_{SD} \\ B_{SD} \end{bmatrix}$$

EXAMPLE 5

This example illustrates the process variations and digital calibrations necessary when color development of this invention is carried out at high temperature. The optimized color developer solution was as follows:

| Compound | Amount |
| --- | --- |
| Water | 800 ml |
| Sodium Borate, 10-hydrate | 14.2 g |
| Potassium carbonate, anhydrous | 34.3 g |
| Potassium bicarbonate | 2.32 g |
| Sodium Sulfite, anhydrous | 0.38 g |
| Sodium metabisulfate | 2.78 g |
| Potassium iodide | 1.20 mg |
| Diethylenetriaminepentaacetic acid pentasodium salt (40% solution) | 8.43 g |
| Hydroxylamine sulfate | 2.41 g |
| Sodium bromide | 5.0 g |
| 4-Amino-3-methyl-N-ethyl-N-hydroxyethyl aniline | 4.0 g |
| Water to make | 1.0 liter |

The color developer solution was adjusted to pH 9.5 and heated to 65° C. Imagewise exposed samples of film were developed for 45 seconds, bleached, fixed, and stabilized using conventional FLEXICOLOR C-41 RA™ solutions and conditions, and dried.

The developed color negative samples were then optically printed using an enlarger calibrated to match a neutral density of 0.60±0.03 for a specific patch of the target. The average standard deviation resulting from Status A density differences between the optical prints from a color negative processed in the above high temperature process and the optical prints from a color negative processed using standard FLEXICOLOR C-41 RA™ process is shown in TABLE X.

Figure 9:
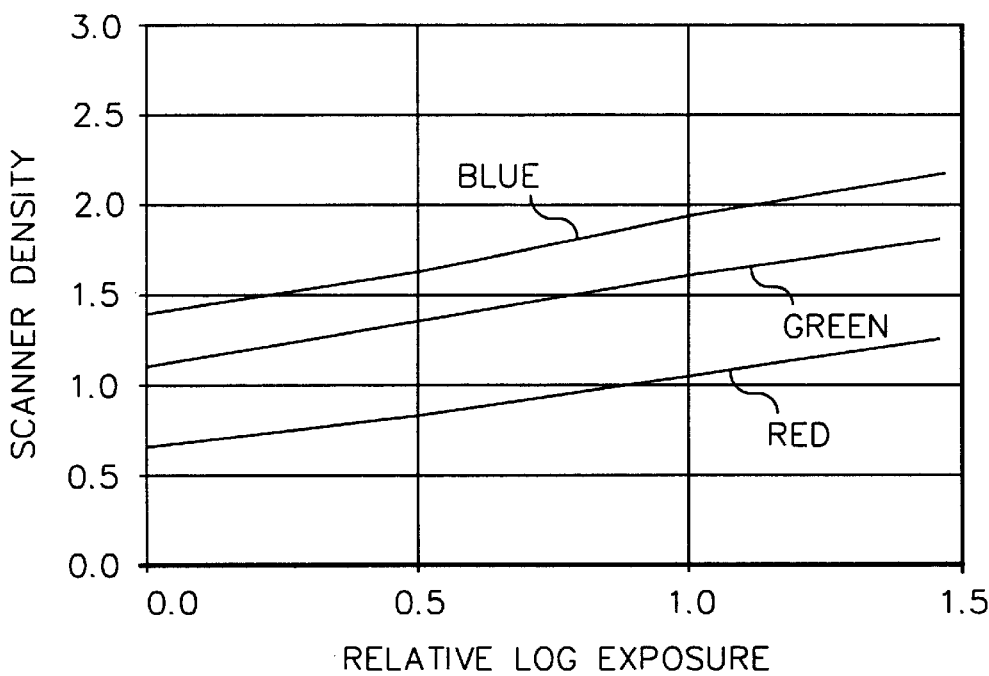
FIG. 9 is a graphical plot of scanner density vs. log E as described in Example 6 below.

The high temperature processed color negatives were then scanned and digitally corrected using a correction factor calculated in the manner described in Example 1 above. For this particular processing formulation there were, as expected, differences in the chemical interactions between the different color records and differences in the film's characteristic curve. The test film's characteristic curves resulting from this process, for each color record, are seen in FIG. 9. The matrix below shows the conversion of scanner density representative digital signals ($R_{SD}$, $G_{SD}$, $B_{SD}$) to channel independent density representative digital signals ($R_{CI}$, $G_{CI}$, $B_{CI}$) for the films processed using the chemistry described above. The average standard deviation resulting from Status A density differences between an image formed from a color negative processed using the high temperature, short time method described above and the image formed from a color negative processed using standard FLEXICOLOR C-41 RA™ chemistry is tabulated in the third column of TABLE X below.

$$\begin{bmatrix} R_{CI} \\ G_{CI} \\ B_{CI} \end{bmatrix} = \begin{bmatrix} 0.9430 & 0.0702 & -0.0132 \\ 0.0115 & 1.0088 & -0.0203 \\ 0.0049 & -0.2622 & 1.2573 \end{bmatrix} \begin{bmatrix} R_{SD} \\ G_{SD} \\ B_{SD} \end{bmatrix}$$

EXAMPLE 7

This example illustrates the process variations and digital calibrations necessary when color development is carried out at low temperature. The optimized color developer solution was as follows:

| Compound | Amount |
|---|---|
| Water | 800 ml |
| Dibasic Sodium phosphate, anhydrous | 14.2 g |
| Potassium carbonate, anhydrous | 34.3 g |
| Potassium bicarbonate | 2.32 g |
| Sodium Sulfite, anhydrous | 0.38 g |
| Sodium metabisulfate | 2.78 g |
| Potassium iodide | 1.20 mg |
| Diethylenetriaminepentaacetic acid pentasodium salt (40% solution) | 8.43 g |
| Hydroxylamine sulfate | 2.41 g |
| Sodium bromide | 1.0 g |
| 4-Amino-3-methyl-N-ethyl-N-hydroxyethyl aniline | 15.0 g |
| Water to make | 1.0 liter |

The color developer solution was adjusted to pH 11.5 and heated to 40° C. Imagewise exposed samples of film were developed for 45 seconds, bleached, fixed, and stabilized using conventional FLEXICOLOR C-41 RA™ solutions and conditions, and dried.

The developed color negative samples were then optically printed using an enlarger calibrated to match a neutral density of 0.60±0.03 for a specific patch of the target. The average standard deviation resulting from Status A density differences between the optical prints from a color negative processed in the above high temperature process and the optical prints from a color negative processed using the standard FLEXICOLOR C-41 RA™ process is shown in TABLE X below.

Figure 10:
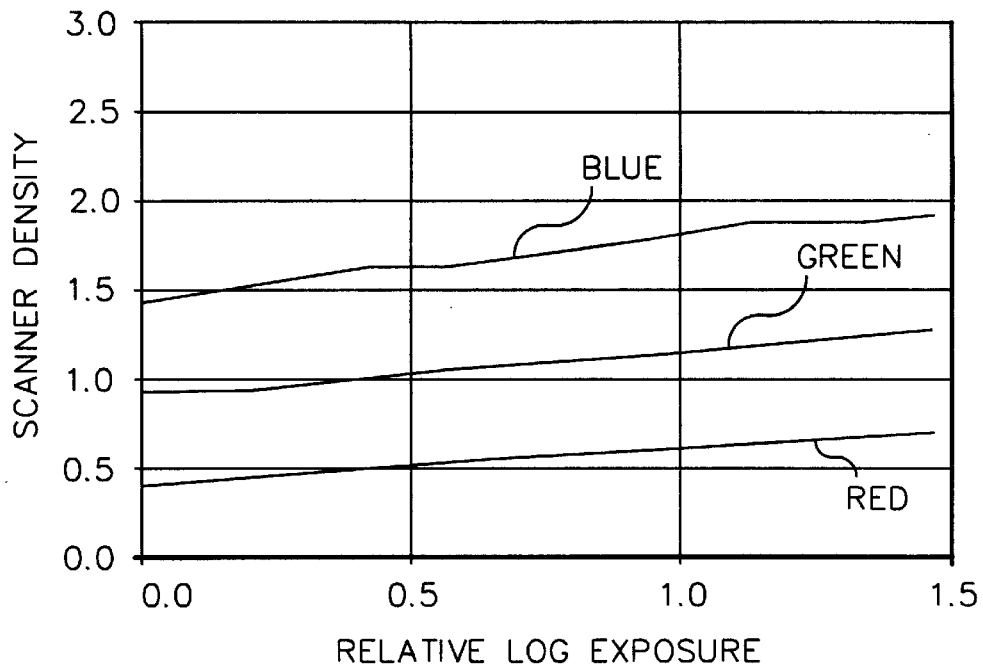
FIG. 10 is a graphical plot of scanner density vs. log E as described in Example 7 below.

The high temperature processed negatives were then scanned and digitally corrected using a correction factor calculated in the manner described in Example 1 above. For this particular processing formulation there were, as expected, differences in the chemical interactions between the different color records and differences in the film's characteristic curve. The test film's characteristic curves resulting from this process, for each color record, can be seen in FIG. 10. The matrix below shows the conversion of scanner density representative digital signals ($R_{SD}$, $G_{SD}$, $B_{SD}$) to channel independent density representative digital signals ($R_{CI}$, $G_{CI}$, $B_{CI}$) for the test film processed using the chemistry described above. The average standard deviation resulting from Status A density differences between an image formed from a color negative processed using the high temperature, short time method described above and the image formed from a color negative processed using standard FLEXICOLOR C-41 RA™ chemistry is tabulated in the third column of TABLE X.

$$\begin{bmatrix} R_{CI} \\ G_{CI} \\ B_{CI} \end{bmatrix} = \begin{bmatrix} 1.1210 & -0.0004 & -0.1207 \\ 0.0250 & 0.9301 & -0.0449 \\ -0.2212 & -0.1649 & 1.3861 \end{bmatrix} \begin{bmatrix} R_{SD} \\ G_{SD} \\ B_{SD} \end{bmatrix}$$

The following Examples 8–10 were carried out to demonstrate the dependence of photographic response on the time of color development. All three examples were run using the same color developer solution (shown below) but color development was for different lengths of time.

| Compound | Amount |
|---|---|
| Water | 800 ml |
| Potassium carbonate, anhydrous | 34.3 g |
| Potassium bicarbonate | 2.32 g |
| Sodium Sulfite, anhydrous | 0.38 g |
| Sodium metabisulfate | 2.78 g |
| Potassium iodide | 1.20 mg |
| Diethylenetriaminepentaacetic acid pentasodium salt (40% solution) | 8.43 g |
| Hydroxylamine sulfate | 2.41 g |
| Sodium bromide | 4.6 g |
| 4-Amino-3-methyl-N-ethyl-N-hydroxyethyl aniline | 12.4 g |
| Water to make | 1.0 liter |

The color developer solution was adjusted to pH 10.1 and heated to 47.6° C.

EXAMPLE 8

Imagewise exposed samples of film were developed for 45 seconds, bleached, fixed, and stabilized using conventional FLEXICOLOR C-41 RA™ solutions and conditions, and dried.

EXAMPLE 9

Imagewise exposed samples of film were similarly processed except that color development was for 60 seconds.

EXAMPLE 10

Imagewise exposed samples of film were similarly processed except that color development was for 90 seconds.

The developed color negative samples from Examples 8–10 were then optically printed using an enlarger calibrated to match a neutral density of 0.60±0.03 for a specific patch of the target. The average standard deviations resulting from Status A density differences between the optical prints from a color negative processed in the above high temperature process and the optical prints from a color negative processed in standard FLEXICOLOR C-41 RA™ process are shown in TABLE X below.

Figure 11:
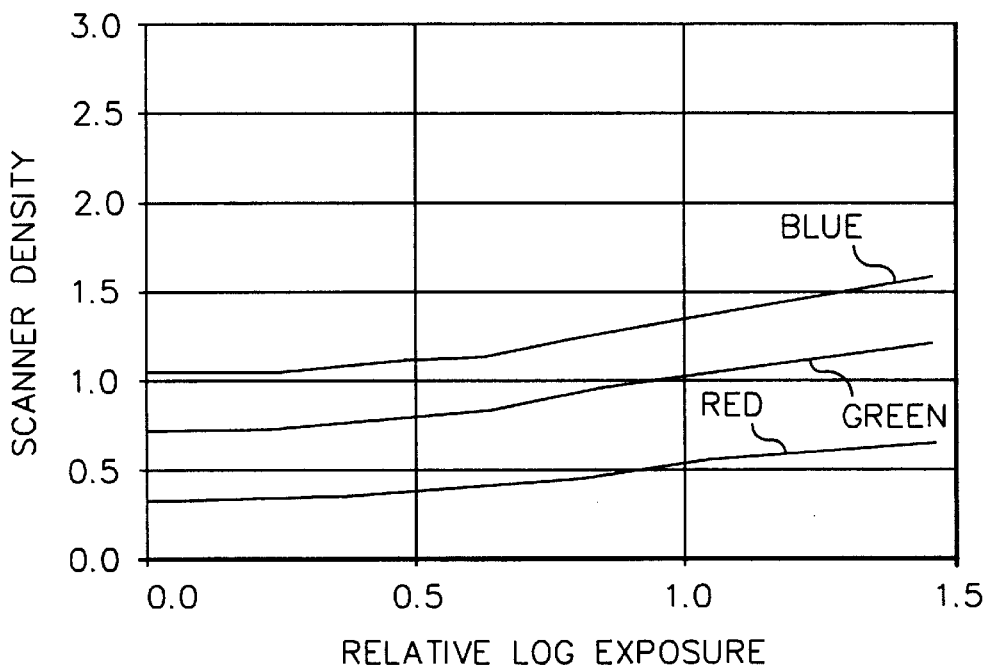
FIG. 11 is a graphical plot of scanner density vs. log E as described in Example 8 below.
Figure 12:
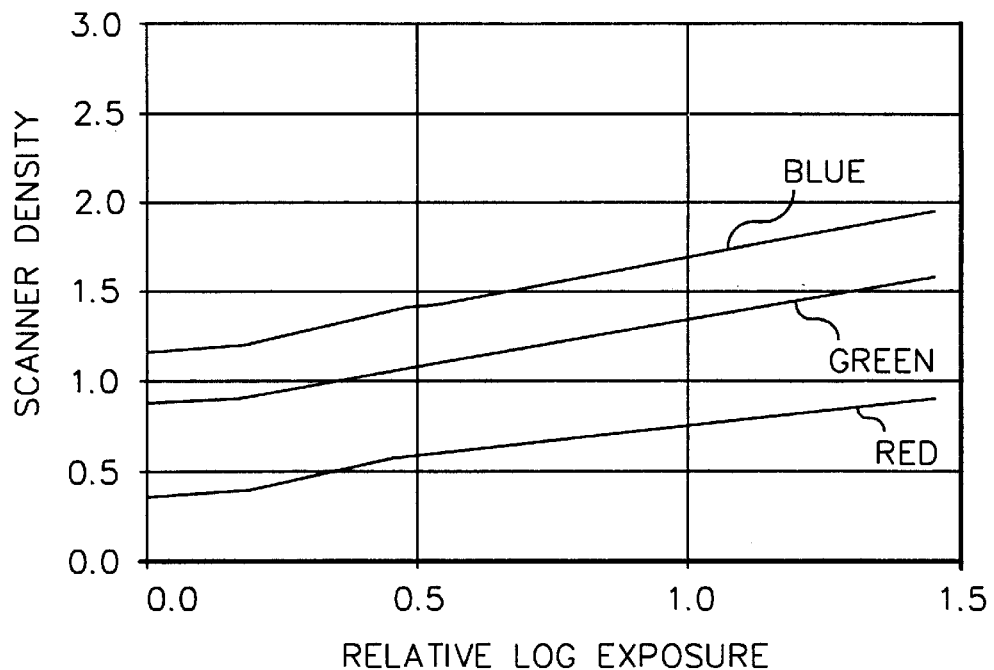
FIG. 12 is a graphical plot of scanner density vs. log E as described in Example 9 below.
Figure 13:
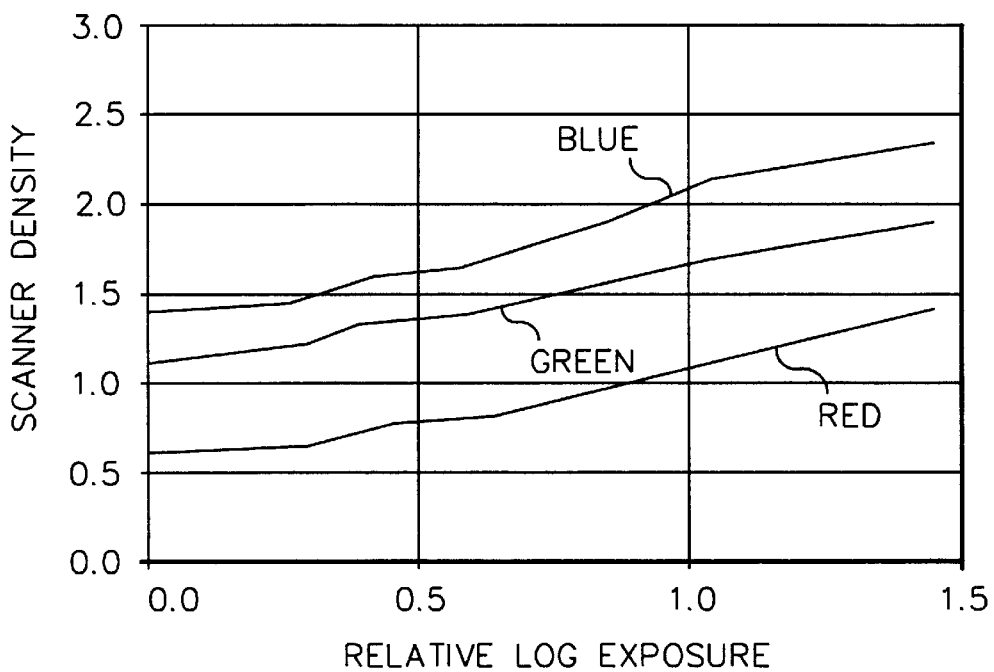
FIG. 13 is a graphical plot of scanner density vs. log E as described in Example 10 below.

The high temperature processed color negatives were then scanned and digitally corrected using a correction factor calculated in the manner described in Example 1 above. As expected, there were differences in the chemical interactions between the different color records and differences in the film's characteristic curve for the films processed at different times in the specified processing conditions. The different characteristic curves resulting from these processing time variations, for each color record, can be seen in FIGS. 11–13, respectively for Examples 8–10. The matrices below show the conversion of scanner density representative digital signals ($R_{SD}$, $G_{SD}$, $B_{SD}$) to channel independent density representative digital signals ($R_{CI}$, $G_{CI}$, $B_{CI}$) for the films processed using the chemistry described above and the various color development times. The average standard deviations resulting from Status A density differences between an image formed from a color negative processed using the high temperature, short time method of this invention and the image formed from a color negative processed using standard FLEXICOLOR C-41 RA™ chemistry are tabulated in the third column of TABLE X.

$$\begin{bmatrix} R_{CI} \\ G_{CI} \\ B_{CI} \end{bmatrix} = \begin{bmatrix} 1.1232 & -0.0294 & -0.0938 \\ 0.0794 & 0.9376 & -0.0170 \\ -0.1011 & 0.0697 & 1.0315 \end{bmatrix} \begin{bmatrix} R_{SD} \\ G_{SD} \\ B_{SD} \end{bmatrix}$$

$$\begin{bmatrix} R_{CI} \\ G_{CI} \\ B_{CI} \end{bmatrix} = \begin{bmatrix} 1.0182 & 0.0410 & -0.0592 \\ 0.0945 & 0.9288 & -0.0233 \\ -0.1106 & +0.0035 & 1.1072 \end{bmatrix} \begin{bmatrix} R_{SD} \\ G_{SD} \\ B_{SD} \end{bmatrix}$$

$$\begin{bmatrix} R_{CI} \\ G_{CI} \\ B_{CI} \end{bmatrix} = \begin{bmatrix} 0.8973 & 0.0951 & 0.0111 \\ 0.0248 & 0.9976 & -0.0224 \\ -0.1790 & -0.2264 & 1.4054 \end{bmatrix} \begin{bmatrix} R_{SD} \\ G_{SD} \\ B_{SD} \end{bmatrix}$$

TABLE X below shows the optical and digital signal (corrected) average standard deviations resulting from Status A density differences between images formed from a color negative processed using the high temperature, short time method of this invention and images formed from a color negative processed using the standard FLEXICOLOR C-41 RA™ processing chemistry.

TABLE X

| Processing Condition | Optical Prints $\bar{S}_{ave}$ | Digital Prints $\bar{S}_{ave}$ |
|---|---|---|
| Example 1 | 15.6 | 6.8 |
| Example 2 | 28.7 | 9.9 |
| Example 3 | 19.7 | 13.7 |
| Example 4 | 17.2 | 4.9 |
| Example 5 | 24.4 | 8.8 |
| Example 6 | 9.6 | 5.8 |
| Example 7 | 29.3 | 7.9 |
| Example 8 | 31.3 | 7.8 |
| Example 9 | 14.8 | 4.3 |
| Example 10 | 8.2 | 6.6 |

The invention has been described in detail with particular reference to preferred embodiments thereof, but it will be understood that variations and modifications can be effected within the spirit and scope of the invention.

We claim:

1. A method for providing a color display image comprising:
   A) developing an imagewise exposed color silver bromoiodide negative working film having at least two color records, with a color developer solution having a pH of from about 9 to about 12, and comprising:
      a color developing agent at from about 0.01 to about 0.1 mol/l, and
      bromide ion at from 0 to about 0.2 mol/l, said developing being carried out for up to about 90 seconds at a temperature at or above about 40° C.,
   B) scanning said developed film to form density representative signals for said at least two color records, and
   C) digitally manipulating said density representative signals formed in step B to correct either or both inter-image interactions and gamma mismatches among said at least two color records to produce a digital record providing a display image having desired aim color and tone scale reproduction.

2. The method of claim 1 wherein said digital record is transmitted to an output device.

3. The method of claim 2 wherein said digital record is transmitted to an output display device.

4. The method of claim 1 wherein said developed film is at least partially fixed before scanning step B.

5. The method of claim 1 wherein said developed film is at least partially desilvered before scanning step B.

6. The method of claim 1 wherein said film has 3 color records.

7. The method of claim 1 wherein said color developer solution pH is from about 9.5 to about 11.

8. The method of claim 1 wherein said color developing agent is present in said color developer solution in an amount of from about 0.01 to about 0.1 mol/l.

9. The method of claim 1 wherein said bromide ion is present in said color developer solution in an amount of from about 0.01 to about 0.15 mol/l.

10. The method of claim 1 wherein said developing step is carried out for from about 30 to about 90 seconds.

11. The method of claim 10 wherein said developing step is carried out for from about 40 to about 90 seconds.

12. The method of claim 1 wherein said developing step is carried out at from about 45° to about 65° C.

13. The method of claim 1 wherein said color developer solution further comprises a hydroxylamine or hydroxylamine derivative as an antioxidant in an amount of at least about 0.001 mol/l.

14. The method of claim 13 wherein said antioxidant is N-isopropyl-N-(2-ethanesulfonic acid)hydroxylamine, N,N-bis(propionic acid)hydroxylamine, N,N-bis(2-ethanesulfonic acid)hydroxylamine, N-isopropyl-N-(n-propylsulfonic acid)hydroxylamine, N-2-ethanephosphonic acid-N-(propionic acid)hydroxylamine, N,N-bis(2-ethanephosphonic acid)hydroxylamine, N-sec-butyl-N-(2-ethanesulfonic acid)hydroxylamine, N,N-bis(sec-butylcarboxylic acid)hydroxylamine, N-methyl-N-(p-carboxylbenzyl)hydroxylamine, N-isopropyl-N-(p-carboxylbenzyl)hydroxylamine, N,N-bis(p-carboxylbenzyl) hydroxylamine, N-methyl-N-(p-carboxyl-m-methylbenzyl) hydroxylamine, N-isopropyl-N-(p-sulfobenzyl) hydroxylamine, N-ethyl-N-(p-phosphonobenzyl) hydroxylamine, N-isopropyl-N-(2-carboxymethylene-3-propionic acid)hydroxylamine, N-isopropyl-N-(2-carboxyethyl)hydroxylamine, N-isopropyl-N-(2,3-dihydroxypropyl)hydroxylamine, and alkali metal salts thereof.

15. The method of claim 1 wherein said silver bromoiodide emulsion comprises from about 0.5 to about 10 mol % iodide ion based on total silver.

16. The method of claim 1 wherein said film comprises three color records, each color record comprising at least one silver bromoiodide emulsion comprising from about 0.5 to about 6 mol % iodide ion based on total silver.

17. The method of claim 1 wherein said color developer comprises iodide ions in a concentration of at least about $5 \times 10^{-7}$ mol/l.

18. The method of claim 1 wherein said digital record is used to provide a color print.

19. The method of claim 1 wherein said developing step is carried out at from about 50° to about 65° C.

20. The method of claim 19 wherein said developing step is carried out at from about 55° to about 65° C. and said film comprises three color records, each color record comprising at least one silver bromoiodide emulsion layer comprising from about 0.5 to about 6 mol % iodide based on total silver.

* * * * *